United States Patent
Sugawa et al.

(10) Patent No.: US 8,184,191 B2
(45) Date of Patent: May 22, 2012

(54) OPTICAL SENSOR AND SOLID-STATE IMAGING DEVICE

(75) Inventors: Shigetoshi Sugawa, Miyagi (JP); Nana Akahane, Miyagi (JP); Satoru Adachi, Ibaraki (JP)

(73) Assignee: Tohoku University, Sendai-Shi (JP)

( * ) Notice: Subject to any disclaimer, the term of this patent is extended or adjusted under 35 U.S.C. 154(b) by 508 days.

(21) Appl. No.: 11/501,060

(22) Filed: Aug. 9, 2006

(65) Prior Publication Data
US 2008/0036888 A1 Feb. 14, 2008

(51) Int. Cl.
H04N 3/14 (2006.01)
H04N 5/335 (2011.01)
H01L 29/04 (2006.01)
H01L 29/10 (2006.01)
H01L 31/00 (2006.01)
H01L 29/15 (2006.01)
H01L 27/14 (2006.01)
H01L 31/062 (2012.01)
H01L 31/113 (2006.01)
H01L 31/101 (2006.01)

(52) U.S. Cl. ........ 348/314; 348/294; 348/296; 348/299; 348/311; 257/59; 257/72; 257/290; 257/292; 257/462

(58) Field of Classification Search ............... 348/294, 348/241–250, 296–299, 302–304, 308, 311–314; 257/59, 233, 431, 466, 333, 72, 290–293, 257/462
See application file for complete search history.

(56) References Cited

U.S. PATENT DOCUMENTS

| 4,242,599 | A  | * | 12/1980 | Suzuki .......................... 327/515 |
|-----------|----|---|---------|------------------------------------------|
| 6,710,804 | B1 | * | 3/2004  | Guidash ........................ 348/302 |
| 7,332,786 | B2 | * | 2/2008  | Altice et al. .................. 257/445 |
| 7,479,675 | B2 | * | 1/2009  | Adachi .......................... 257/292 |
| 7,518,143 | B2 | * | 4/2009  | Sugawa .......................... 257/59 |
| 7,800,673 | B2 | * | 9/2010  | Sugawa et al. ................ 348/308 |
| 7,820,467 | B2 | * | 10/2010 | Sugawa .......................... 438/48 |
| 2001/0000068 | A1 |   | 3/2001 | Isogai et al. |
| 2001/0002848 | A1 | * | 6/2001 | Fossum et al. ................ 348/311 |
| 2002/0000508 | A1 |   | 1/2002 | Muramatsu et al. |
| 2005/0110093 | A1 |   | 5/2005 | Altice, Jr. et al. |
| 2005/0237404 | A1 | * | 10/2005 | Jerdev et al. .................. 348/303 |
| 2006/0158543 | A1 | * | 7/2006 | Ueno et al. .................... 348/308 |

(Continued)

FOREIGN PATENT DOCUMENTS

EP 0 708 555 A2 4/1996

(Continued)

OTHER PUBLICATIONS

S. Ionue et al., "A 3.25 M-pixel APS-C size CMOS Image Sensor," 2001 IEEE Workshop on Charge-Coupled Devices and Advanced Image Sensors, 2001, pp. 16-19.

(Continued)

Primary Examiner — Jason Chan
Assistant Examiner — Michael Osinski
(74) Attorney, Agent, or Firm — Foley & Lardner LLP

(57) ABSTRACT

A solid-state imaging device includes a plurality of pixels stored in one-dimensional or two-dimensional array, each of the plurality of pixels including a photodiode receiving light and producing photocharges, an overflow gate coupled to the photodiode and transferring photocharges that overflow the photodiode during a storage operation, and a storage capacitor element that stores the photocharges transferred by the overflow gate during the storage operation.

6 Claims, 34 Drawing Sheets

U.S. PATENT DOCUMENTS

| | | | |
|---|---|---|---|
| 2006/0181628 A1* | 8/2006 | Kishi | 348/308 |
| 2006/0208291 A1* | 9/2006 | Koizumi et al. | 257/292 |
| 2006/0221667 A1* | 10/2006 | Ogura et al. | 365/149 |
| 2007/0013798 A1* | 1/2007 | Ahn et al. | 348/308 |
| 2007/0131991 A1* | 6/2007 | Sugawa | 257/292 |

FOREIGN PATENT DOCUMENTS

| | | |
|---|---|---|
| EP | 0 862 291 A2 | 9/1998 |
| EP | 1 681 851 A1 | 7/2006 |
| EP | 1 732 134 A1 | 12/2006 |
| JP | 05-090556 | 4/1993 |
| JP | 6-244403 | 9/1994 |
| JP | 11-284166 | 10/1999 |
| JP | 2000-165753 A | 6/2000 |
| JP | 2002-077737 A | 3/2002 |
| JP | 2003-134396 A | 5/2003 |
| JP | 2006-217410 A | 8/2006 |
| WO | WO 2005/083790 A1 | 9/2005 |
| WO | WO 2005/101816 A1 | 10/2005 |
| WO | WO 2006/109683 A1 | 10/2006 |

OTHER PUBLICATIONS

Y. Muramatsu et al., "A Signal-Processing CMOS Image Sensor Using a Simple Analog Operation," IEEE Journal of Solid-State Circuits, vol. 38:1, Jan. 2003, pp. 101-106.

T, Kakumoto et al., "Logarithmic Conversion CMOS Image Sensor with FPN Cancellation and Integration Circuits," The Journal of the Institute of Image Information and Television Engineers, vol. 57:8, 2003, pp. 1013-1018.

* cited by examiner

OPTICAL SENSOR AND SOLID-STATE IMAGING DEVICE

BACKGROUND OF THE INVENTION

The present invention relates to an optical sensor and solid-state imaging device, and specifically, to a one-dimensional or two-dimensional solid-state imaging device of CMOS or CCD sensors, and an operating method for the above-described solid-state imaging device.

Image sensors such as a CMOS (complementary metal-oxide semiconductor) image sensor and CCD (charge coupled device) image sensor have been improved in their properties and find widespread application in digital cameras, cellular phones with cameras, scanners, and so on.

However, further property improvements are demanded of the image sensors. One of them is to extend the dynamic range. The dynamic range of conventionally used image sensors remains, for example, on the order of 3 to 4 digits (60 to 80 dB), and hence, expectations are being placed on the realization of a high-quality image sensor having a dynamic range at least 5 to 6 digits (100 to 120 dB), comparable to that of the naked eye or a silver-halide film.

As a technique for enhancing the image quality of the above-described image sensors, for example, S. Inoue et al., "IEEE Workshop on CCDs and Advanced Image Sensor 2001, pp. 16-19" (hereinafter referred to as "Non-Patent Document 1") sets forth, with a view to bringing about a high sensitivity and high S/N ratio, a technique for reducing noises by reading noise signals occurring in a floating region adjacent to the photodiode of each pixel and the noise signals added with an optical signal, and taking the difference therebetween. However, even by this method, an achievable dynamic range would be on the order, at the highest, of 80 dB. Realization of even wider dynamic ranges is demanded.

Also, for example, as shown in FIG. 1, Japanese Unexamined Patent Application Publication (JP-A) No. 2003-134396 (hereinafter, "Patent Document 1") discloses a technique for extending the dynamic range by connecting a floating region having a small capacitor C1 located on the high-sensitivity and low illuminance side, as well as a floating region having a large capacitor C2 located on the low-sensitivity and high illuminance side to the photodiode PD, and outputting a low-illuminance side output OUT1 and a high-illuminance side output OUT2, respectively.

Furthermore, as shown in FIG. 2, Japanese Unexamined Patent Application Publication (JP-A) No. 2000-165754 (hereinafter, "Patent Document 2") discloses a technique for extending the dynamic range by making variable a capacitor CS in the floating diffusion (FD) region. Moreover, there is another disclosed technique for extending the dynamic range by dividing an imaging into imagings with at least two different exposure time periods, including an imaging with a short exposure time period corresponding to the high illuminance side and an imaging with a long exposure time period corresponding to the low illuminance side.

Furthermore, as shown in FIG. 3, Japanese Unexamined Patent Application Publication (JP-A) No. 2002-77737 (hereinafter, "Patent Document 3"), and Y. Muramatsu et al., IEEE Journal of Solid-State Circuits, Vol. 38, No. 1, pp. 16-19 (hereinafter, "Non-Patent Document 2") disclose a technique for extending the dynamic range by providing a transistor switch T between a photodiode PD and a capacitor C, turning on the switch T in a first exposure period to store optical signal charges in both of the photodiode PD and capacitor C, and turning off the switch T in a second exposure period to store optical changes in the photodiode PD on top of the stored charges in the first exposure period. Here, these documents disclose therein that, when there is provided light irradiation beyond its saturation value, excess charges are discharged through a reset transistor R.

Furthermore, as shown in FIG. 4, Japanese Unexamined Patent Application Publication (JP-A) No. 5-90556 (hereafter, "Patent Document 4") discloses a technique for allowing addressing high-illuminance imaging by using a capacitor larger than conventional one, as a photodiode PD.

Besides, as shown in FIG. 5, The Journal of the Institute of Image Information and Television Engineers, Vol. 57, 2003 (hereinafter, "Non-Patent Document 3") discloses a technique for extending the dynamic range by storing and outputting optical current signals from a photodiode PD while logarithmically converting the signals by a logarithm conversion circuit constituted by combining MOS transistors.

In the methods set forth in the above-described Patent Documents 1, 2, and 3, and Non-Patent Document 2, or the method for imaging with two or more different exposure time periods, the imaging on the low illuminance side and the imaging on the high illuminance side are performed at times different from each other. This raises a problem in that a time lag occurs between imaging times of the at least two imagings to thereby impair qualities of moving images.

Moreover, in the methods set forth in the above-described Patent Documents 4 and 3, a wide dynamic range can be achieved by the imaging such as to correspond to the high-illuminance side, but as far as the imaging on the low-illuminance side is concerned, a low sensitivity and low S/N ratio are undesirably resulted to thereby impair image quality.

As described above, in image sensors such as the CMOS image sensor, it has been difficult to attain a wide dynamic range while maintaining a high sensitivity and high S/N ratio. The foregoing applies not only to image sensors in which pixels are arranged in a two-dimensional array, but also to linear sensors in which pixels are arranged in a one-dimensional array, and an optical sensor without a plurality of pixels.

SUMMARY OF THE INVENTION

Accordingly, it is an object of the present invention to provide a solid-state imaging device capable of extending the dynamic range while maintaining a high-sensitivity and high S/N ratio.

According to the solid-state imaging device of the present invention, a wide dynamic range can be achieved by maintaining a high-sensitivity and high S/N ratio in low-illuminance imaging by a photodiode that receives light and that produces and stores photocharges, and further by performing high-illuminance imaging by storing, in a storage capacitor, photocharges overflowing the photodiode through an overflow gate.

According to one aspect of the present invention, an optical sensor is provided. The optical sensor comprises: a photodiode receiving light and producing photocharges; an overflow gate coupled to the photodiode and transferring photocharges that overflow the photodiode during a storage operation; and a storage capacitor element that stores the photocharges transferred through the overflow gate during the storage operation.

The optical sensor further comprises a transfer transistor coupled to the photodiode and a floating region, wherein the transfer transistor transfers photocharges from the photodiode to the floating region.

The overflow gate may be constituted of a junction transistor. In this case, it is preferably that a semiconductor region forming a gate of the junction a transistor is connected to a semiconductor region forming a surface region of the photodiode and to a well region where the photodiode and the overflow gate are formed.

The overflow gate may be formed at a predetermined depth of the substrate in which the overflow gate is formed. In this case, it is preferable that the overflow gate has a semiconductor layer of the same conductive type as a channel of the overflow gate, the semiconductor layer reducing a barrier to punch through in the overflow gate.

The storage capacitor element may comprise: a semiconductor region serving as a lower electrode, formed in a surface layer portion of the semiconductor substrate in which the optical sensor is formed; a capacitor insulating film formed on the semiconductor region; and an upper electrode formed on the capacitor insulating film.

The storage capacitor element may comprise: a lower electrode formed on the substrate in which the optical sensor is formed; a capacitor insulating film formed on the lower electrode; and an upper electrode formed on the capacitor insulating film.

The storage capacitor element may comprise: a semiconductor region serving as a lower electrode, formed in an inner wall of a trench formed in the semiconductor substrate in which the optical sensor is formed; a capacitor insulating film formed on the inner wall of the trench; and an upper electrode formed on the capacitor insulating film and embedding the trench.

A solid-state imaging device comprising a plurality of pixels arranged in one-dimensional or two-dimensional array, each of the pixels having the optical sensor mentioned above is also provided.

The overflow gate may be constituted of a MOS transistor or a junction transistor.

Another solid-state imaging device comprising a plurality of pixel blocks is also provided. In this device, each of the plurality of pixel blocks includes a plurality of pixels and a single floating region. Each of the plurality of pixels includes: a photodiode receiving light and producing photocharges; an overflow gate coupled to the photodiode and transferring photocharges that overflow the photodiode during a storage operation; a storage capacitor element that stores the photocharges transferred through the overflow gate during the storage operation, and a transfer transistor coupled to the photodiode and the single floating region.

The transfer transistor may be a buried channel transistor that has a semiconductor layer of the same conductive type as a channel of the transfer transistor formed up to a predetermined depth from the surface or the vicinity of the surface of a substrate in which the transfer transistor is formed.

The solid-state imaging devices, comprising a plurality of pixels, each of pixels having the optical sensor mentioned above, may further comprise: a reset transistor coupled to the floating region, for discharging signal charges in the storage capacitor element and the floating region; a transistor provided between the floating region and the storage capacitor element; an amplification transistor for reading signal charges in the floating region, or in both of the floating region and the storage capacitor element as a voltage; a selection transistor coupled to the amplification transistor, for selecting the pixel.

The solid-state imaging devices may further comprise: a reset transistor coupled to the storage capacitor element, for discharging signal charges in the storage capacitor element and the floating region; a transistor provided between the floating region and the storage capacitor element; an amplification transistor for reading signal charges in the floating region, or in both of the floating region and the storage capacitor element as a voltage; a selection transistor coupled to the amplification transistor, for selecting the pixel.

The solid-state imaging devices, comprising a plurality of pixels, each of pixels having the optical sensor mentioned above, may further comprise noise cancel means taking the difference between: a voltage signal obtained from photocharges transferred to the floating region, or to both of the floating region and the storage capacitor element; and a voltage signal at a reset level of the floating region, or of both of the floating region and storage capacitor element.

The solid-state imaging devices may further comprise storage means for storing a voltage signal at the reset level in the floating region and the storage capacitor element.

According to another aspect of the present invention, a method of outputting signals from an optical sensor comprising a photodiode and a storage capacitor element is provided. The method comprises the steps of: storing, to the photodiode, first photocharges produced by the photodiode before photocharges produced by the photodiode after the saturation; and outputting the signals on the basis of the first and second photocharges.

The overflow gate may be constituted of an MOS transistor coupled between the photodiode and the storage capacitor, the gate electrode of the MOS transistor receiving a signal that determines the storage operation.

DESCRIPTION OF THE PREFERRED EMBODIMENTS

Hereinafter, a solid-state imaging device according to embodiments of the present invention will be described with reference to the accompanying drawings. Throughout these drawings, the same reference signs designate the same or equivalent parts.

First Embodiment

Figure 1:
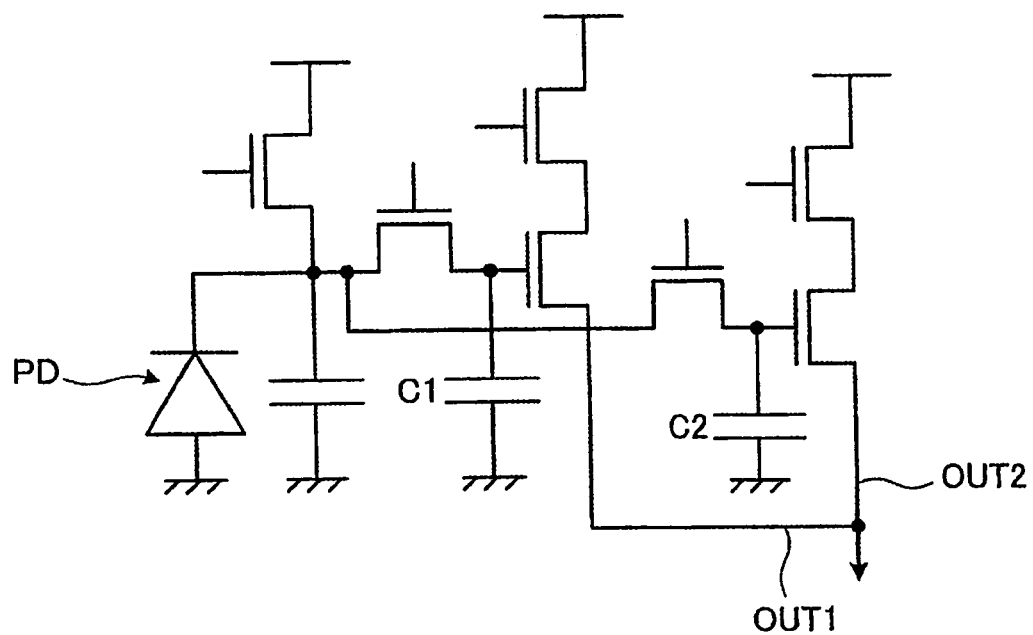
FIG. 1 is an equivalent circuit diagram corresponding to the Patent Document 1.
Figure 2:
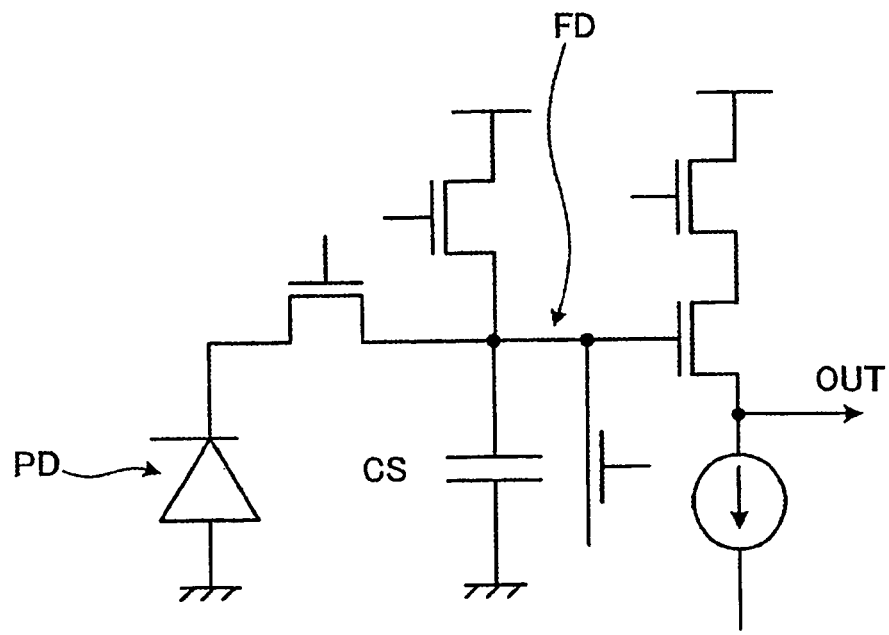
FIG. 2 is an equivalent circuit diagram corresponding to the Patent Document 2.
Figure 3:
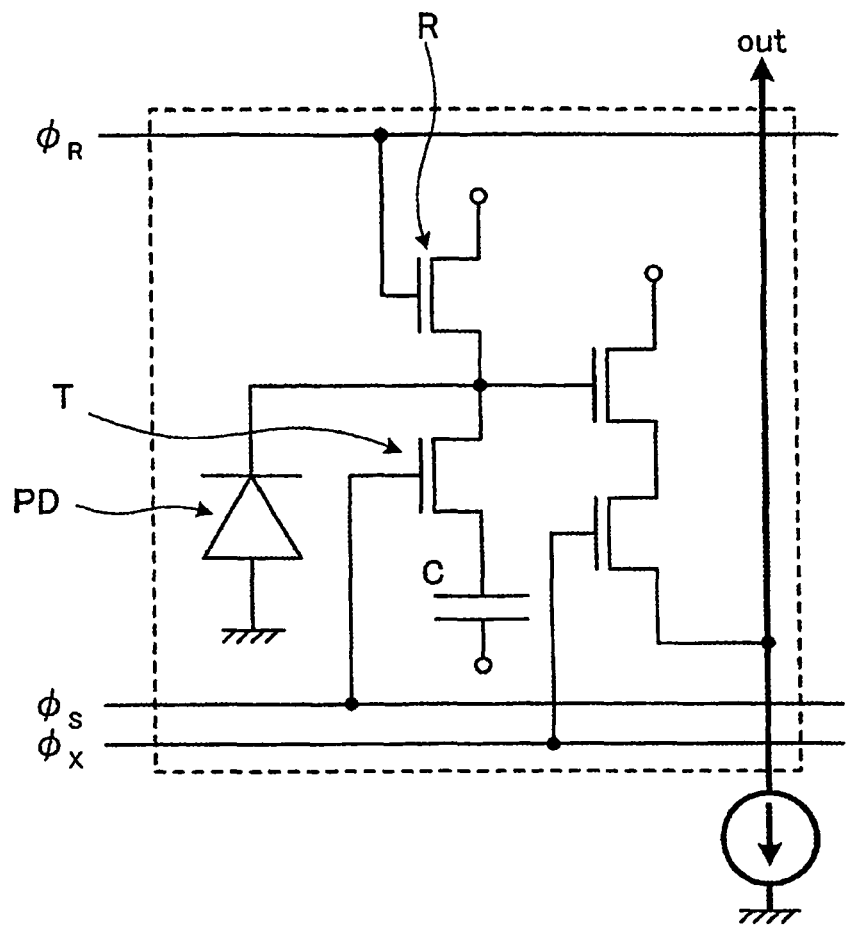
FIG. 3 is an equivalent circuit diagram corresponding to the Patent Document 3.
Figure 4:
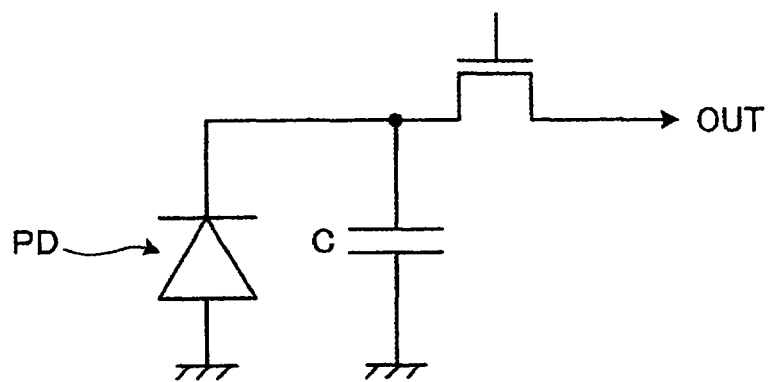
FIG. 4 is an equivalent circuit diagram corresponding to the Patent Document 4.
Figure 5:
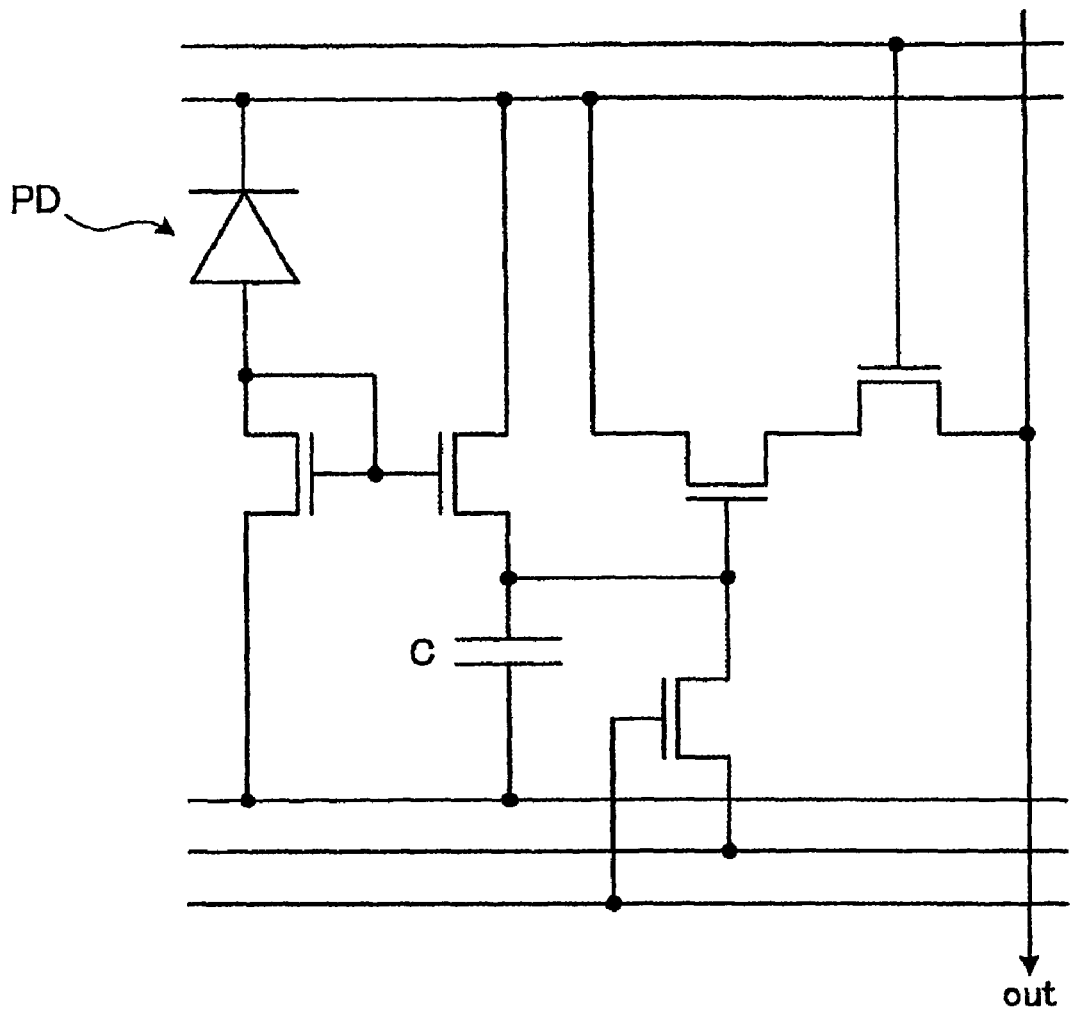
FIG. 5 is an equivalent circuit diagram corresponding to the Non-Patent Document 3.
Figure 6:
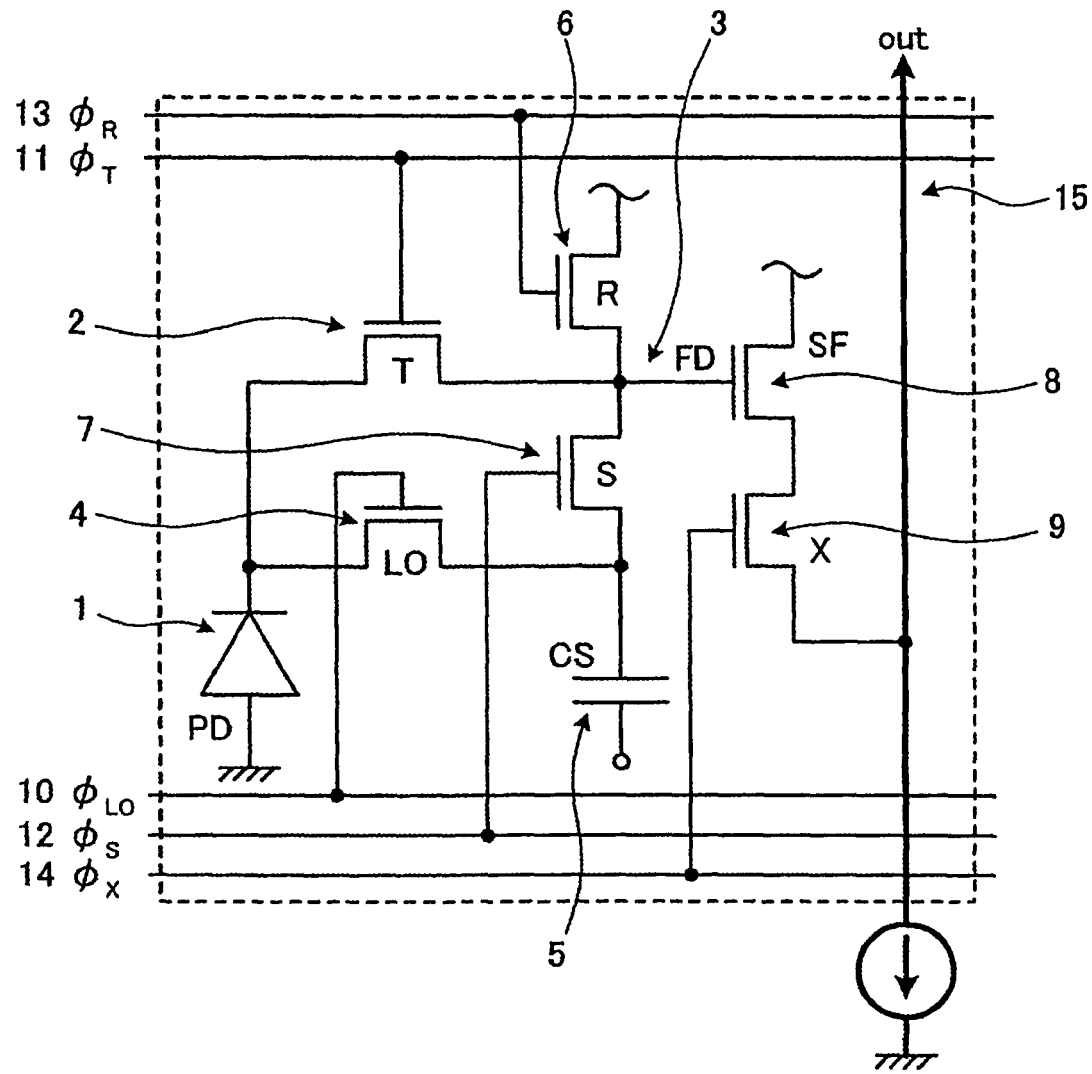
FIG. 6 is an equivalent circuit diagram of a pixel in a solid-state imaging device according to a first embodiment of the present invention.
Figure 7:
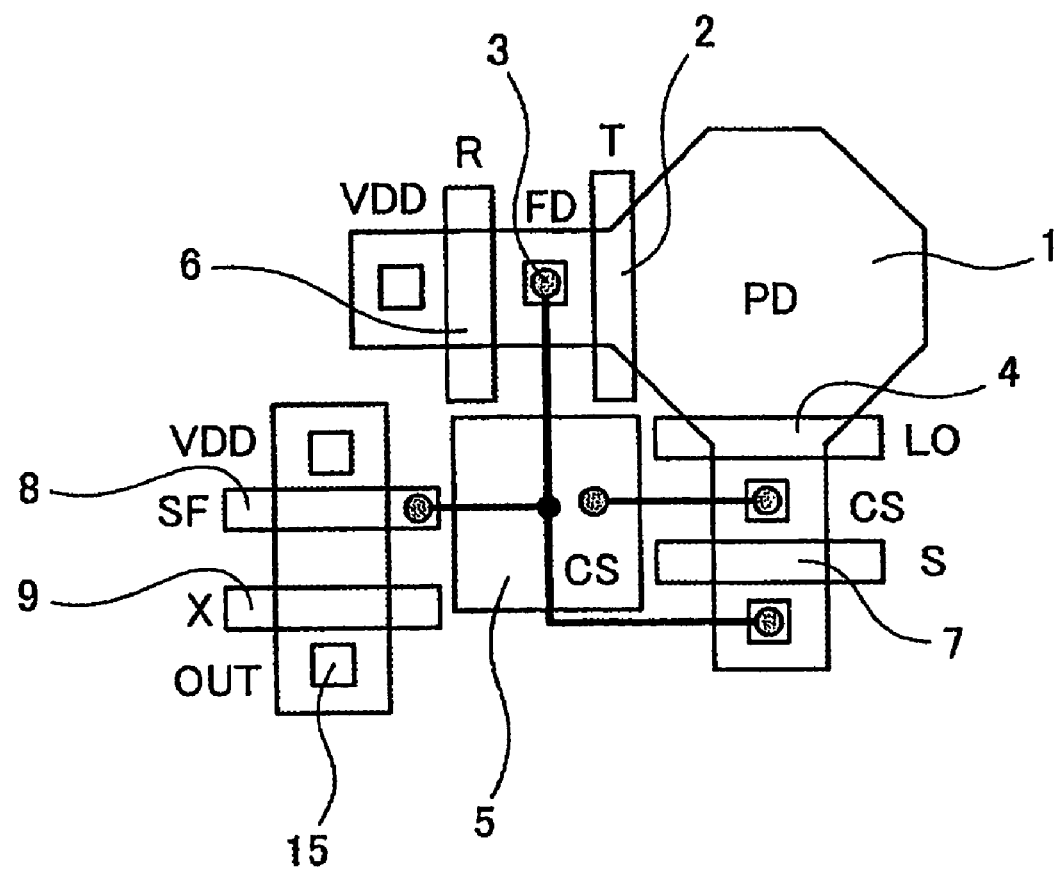
FIG. 7 is a schematic plan view of the pixel in the solid-state imaging device according to the first embodiment of the present invention.

FIG. 6 shows an equivalent circuit of a pixel in the solid-state imaging device according to a first embodiment of the present invention, and FIG. 7 is a schematic plan view thereof.

Each pixel comprises: a photodiode PD1 that receives light and that produces and stores photocharges; a transfer transistor T2 provided adjacently to the photodiode PD1 and transferring the photocharges; a floating region (floating region) FD3 connected to the photodiode PD1 via the transfer transistor T2; an overflow gate LO4 provided adjacently to the photodiode PD1 and transferring photocharges that overflow the photodiode PD1 during a storage operation; a storage capacitor CS5 that stores photocharges overflowing the photodiode PD1 through the overflow gate LO4 during the storage operation; a reset transistor R6 connected to the floating region FD3, for discharging signal charges in the storage capacitor CS5 and the floating region FD3; a storage transistor S7 provided between the floating region FD3 and the storage capacitor CS5; an amplification transistor SF8 for reading signal charges in the floating region FD3, or those in both of the floating region FD3 and the storage capacitor CS5, as a voltage; and a selection transistor X9 connected to the amplification transistor SF8, for selecting the pixel or a pixel block.

In the solid-state imaging device according to this embodiment, a plurality of pixels, each having the above-described arrangement, is stored in two-dimensional or one-dimensional array. In each pixel, drive lines $\phi_{LO}$ 10, $\phi_T$ 22, $\phi_S$ 12, and $\phi_R$ 13, respectively, are connected to gate electrodes of the overflow gate LO4, transfer transistor T2, storage transistor S7, and reset transistor R6. Also, a pixel selection line $\phi_X$ 14 driven by a row shift register is connected to a gate electrode of the selection transistor X9. Furthermore, an output line OUT 15 is connected to the output side source of the selection transistor X9, and controlled by a column shift register to produce an output.

The construction of the solid-state imaging device according to this embodiment is not limited, as long as the voltage of the floating region FD3 can be fixed to an appropriate value so as to be able to perform selection operations or non-selection operations of pixels. Therefore, the selection transistor X9 and drive line $\phi_X$ 14 may also be omitted.

Figure 8A:
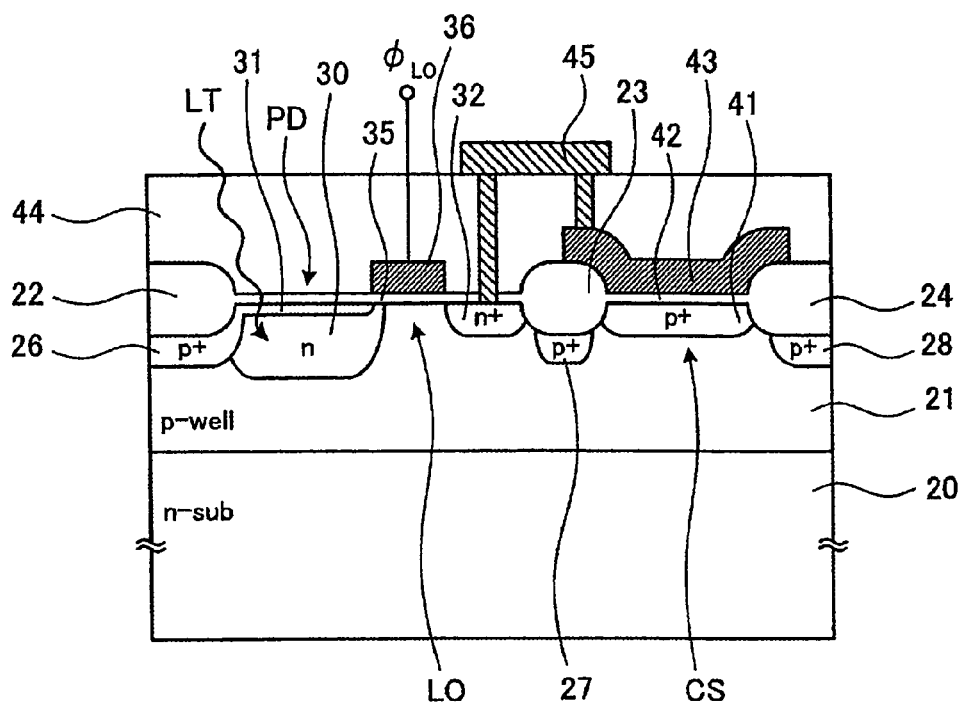
FIG. 8A is a schematic sectional view representing the regions of a photodiode PD1, overflow gate LO4, and storage capacitor CS5 in the pixel of the solid-state imaging device according to the first embodiment of the present invention.
Figure 8B:
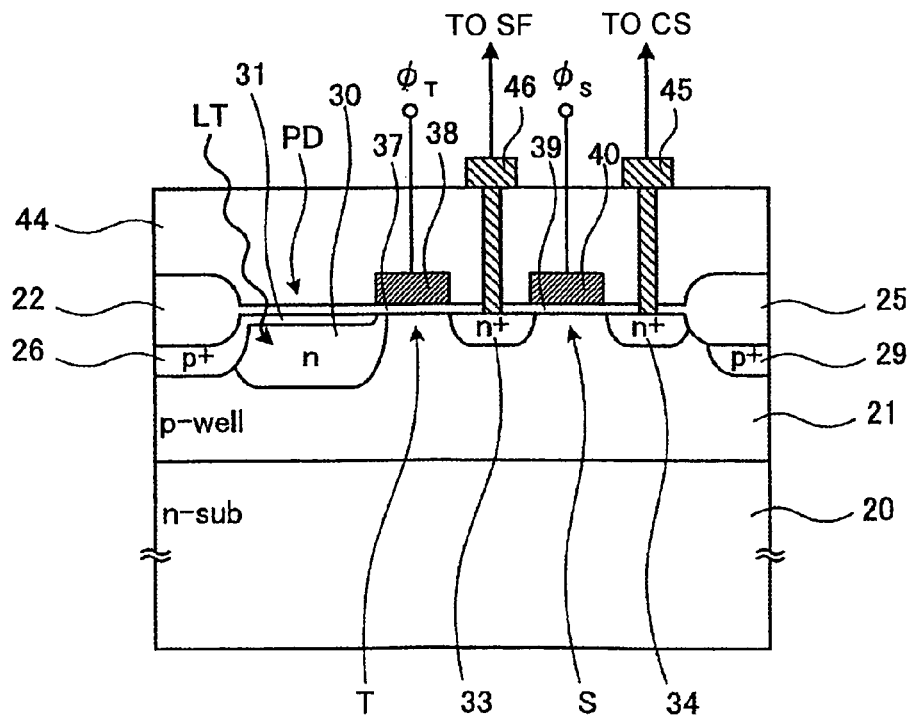
FIG. 8B is a schematic sectional view representing the regions of a photodiode PD1, transfer transistor T2, floating region FD3, storage transistor S7, and storage capacitor CS5 in the pixel of the solid-state imaging device according to the first embodiment of the present invention.

FIG. 8A is a schematic sectional view representing the regions of the photodiode PD1, overflow gate LO4, and storage capacitor CS5 in a pixel of the solid-state imaging device according to the present, and FIG. 8B is a schematic sectional view representing the regions of a photodiode PD1, transfer transistor T2, floating region FD3, storage transistor S7, and storage capacitor CS5 in the pixel.

For example, on an n type silicon semiconductor substrate (n-sub) 20, a p type well (p-well) 21 is formed, and element separation insulating films 22, 23 24, and 25 by the LOCOS method or the like, for separating individual pixels and a storage capacitor CS region are formed. Furthermore, p+type separation regions 26, 27, 28, and 29 are formed in the p type well 21 below the element separation insulating films for separating pixels. An n type semiconductor region 30 is formed in the p type well 21, and on its surface layer, a p+type semiconductor region 31 is formed. By this pn junction, a charge transfer embedded photodiode PD is constituted. When light LT enters a depletion layer produced by applying an appropriate bias to the pn junction, a photocharge is generated by a photoelectric effect.

At an end portion of the n type semiconductor region 30, there is a region formed so as to run off the p+type semiconductor region 31, and at a position spaced apart from this region by a predetermined distance, an n+type semiconductor region 32 is formed in the surface layer of the p type well 21.

Moreover, at the end portion of the n type semiconductor region 30, there is another region formed so as to run off the p+type semiconductor region 31, and at a position spaced apart from the other region by a predetermined distance, an n+type semiconductor region 33 serving as the floating region FD, is formed in the surface layer of the p type well 21. Furthermore, an n+type semiconductor region 34 is formed at a position spaced apart from the above-described other region by a predetermined distance.

Here, in the regions associated with the n type semiconductor region 30 and n+type semiconductor region 32, a gate electrode 36 made of polysilicon or the like is formed on the top surface of the p type well 21 via a gate insulating film 35 constituted of silicon oxide or the like, and there is provided an overflow gate LO having a channel forming region in the surface layer of the p type well, with the n type semiconductor region 30 and n+type semiconductor region 32 as a source/drain.

Furthermore, in the regions associated with the n type semiconductor region 30 and n+type semiconductor region 33, a gate electrode 38 made of polysilicon or the like is formed on the top surface of the p type well 21 via a gate insulating film 37 constituted of silicon oxide or the like, and there is provided a transfer transistor T having a channel forming region in the surface layer of the p type well, with the n type semiconductor region 30 and n+type semiconductor region 33 as a source/drain.

Moreover, in the regions associated with the n+type semiconductor region 33 and n+type semiconductor region 34, a gate electrode 40 made of polysilicon or the like is formed on the top surface of the p type well 21 via a gate insulating film 39 constituted of silicon oxide or the like, and there is provided a storage transistor S having a channel forming region in the surface layer of the p type well, with the n+type semiconductor region 33 and n+type semiconductor region 34 as a source/drain.

Besides, in the region separated by the element separation insulating films 22 and 23, a p+type semiconductor region 41 serving as a lower electrode is formed in the surface layer of the p type well, and on the top of this layer, an upper electrode 43 made of polysilicon or the like is formed via a capacitor insulating film 42 constituted of silicon oxide or the like. These constitute a storage capacitor CS.

An insulating film 44 constituted of silicon oxide or the like is formed so as to coat the overflow gate LO, transfer transistor T, storage transistor S, and storage capacitor CS. There is provided an opening section extending from the n+type semiconductor region 32 and n+type semiconductor region 33 through the n+type semiconductor region 34 up to the upper electrode 43. Also, there are provided wiring 45 connecting the n+type semiconductor region 32 and upper electrode 43, and wiring 46 connecting with the n+type semiconductor region 33.

The drive line $\phi_T$ is connected to a gate electrode 38 of the transfer transistor T, and the drive line $\phi_S$ is connected to a gate electrode 40 of the storage transistor S.

The drive line $\phi_{LO}$ is connected to a gate electrode 36 of the overflow gate LO. The drive line $\phi_{LO}$ may be subjected to an application of drive pulse signals, or alternatively may be connected to a zero potential as in the case of the p type well 21. The threshold voltage for the overflow gate LO is set to an value lower than that for the transfer transistor T so that excess charges beyond a saturation value of the photodiode PD efficiently are allowed to efficiently flow to the storage capacitor CS through the overflow gate LO. When the threshold voltages of the overflow gate LO and transfer transistor T are to be made the same, setting the potential to a value higher than the zero potential allows the excess charges beyond saturation value of the photodiode PD efficiently flow to the storage capacitor CS through the overflow gate LO.

Regarding the other constituent elements, i.e., the reset transistor R, amplification transistor SF, selection transistor X, drive lines $\phi_R$ and $\phi_X$, and output line OUT, they are constructed on non-illustrated regions on the semiconductor substrate 20 shown in FIGS. 8A and 8B in such a manner that wiring 46 is connected to the amplification transistor SF (not shown) so that the construction results in the one shown in the equivalent circuit diagram in FIG. 6.

The photodiode PD constitutes a capacitor $C_{PD}$ with a relatively shallow potential, whereas the floating region FD and storage capacitor CS, respectively, constitute capacitors $C_{FD}$ and $C_{CS}$ with a relatively deep potential.

Figure 9:
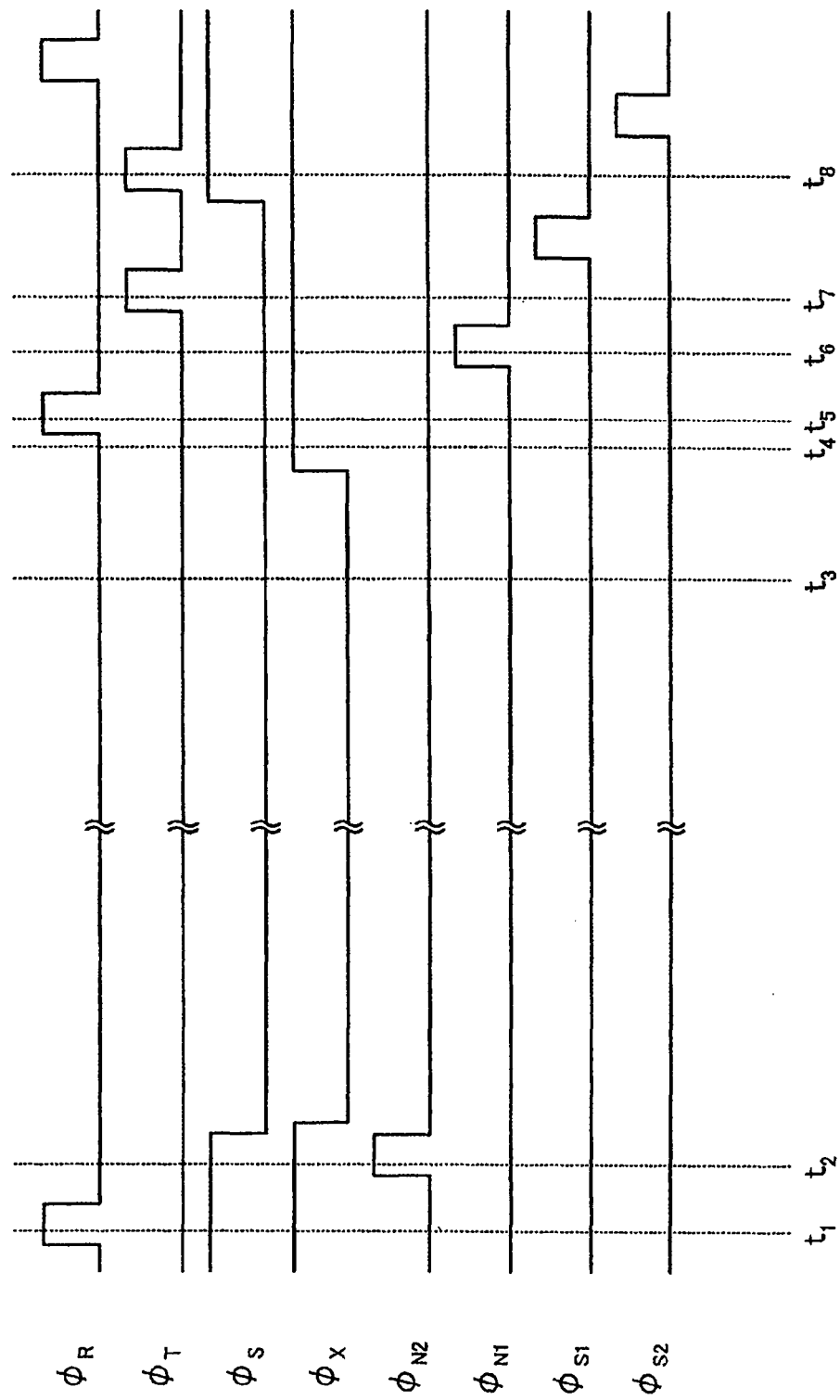
FIG. 9 is a drive timing diagram of the solid-state imaging device according to the first embodiment of the present invention.

Here, description is made of an operating method for the solid-state imaging device according to this embodiment shown in FIGS. 6, 7, 8A, and 8B. FIG. 9 is a drive timing diagram for the solid-state imaging device according to this embodiment.

First, prior to exposure storage, the storage transistor S is set to one, and the transfer transistor T and reset transistor R are set to off. At this time, the photodiode PD is in a completely depleted state. Next, the reset transistor R is switched on, to reset the floating region FD and storage capacitor CS (time: $t_1$). Then, reset noises of (FD+CS) captured immediately after the reset transistor R has been switched off, are read as noise signals N2 (time: $t_2$). Here, the noise signals N2 include variations in the threshold voltage of the amplification transistor SF, as a fixed pattern noise component. During storage period (time: $t_3$), in a state where the storage transistor S, transfer transistor T, reset transistor R, and selection transistor X are switched off, photocharges before saturation are stored by the photodiode PD, and excess photocharges when the saturation is exceeded, are stored in the storage capacitor CS via the overflow gate LO. This operation allows charges overflowing the photodiode PD to be effectively used without being thrown away. In this manner, in both periods before and after saturation, storage operations are performed by receiving light by the same photodiode PD for each pixel in the same storage period.

After the storage has been completed (time: $t_4$), the selection transistor X is switched on. Then, the reset transistor R is switched on, to reset the flowing region FD (t: $t_5$), and FD reset noises captured immediately after the reset are read as noise signals N1 (time: $t_6$). Here, the noise signals N1 include variations in the threshold voltage of the amplification transistor SF, as a fixed pattern noise component.

Next, the transfer transistor T is switched on, to completely transfer optical signals stored in the photodiode PD to the floating region FD (time: $t_7$), and the signals are read as (S1+N1). Then, the storage transistor S is also switched on, to completely transfer photocharges stored in the photodiode PD to the floating region FD and storage capacitor CS (time: $t_8$). The charges stored in the photodiode PD, floating region FD, and storage capacitor CS are mixed, and the signals are read as (S1+S2+N1).

Figure 10:
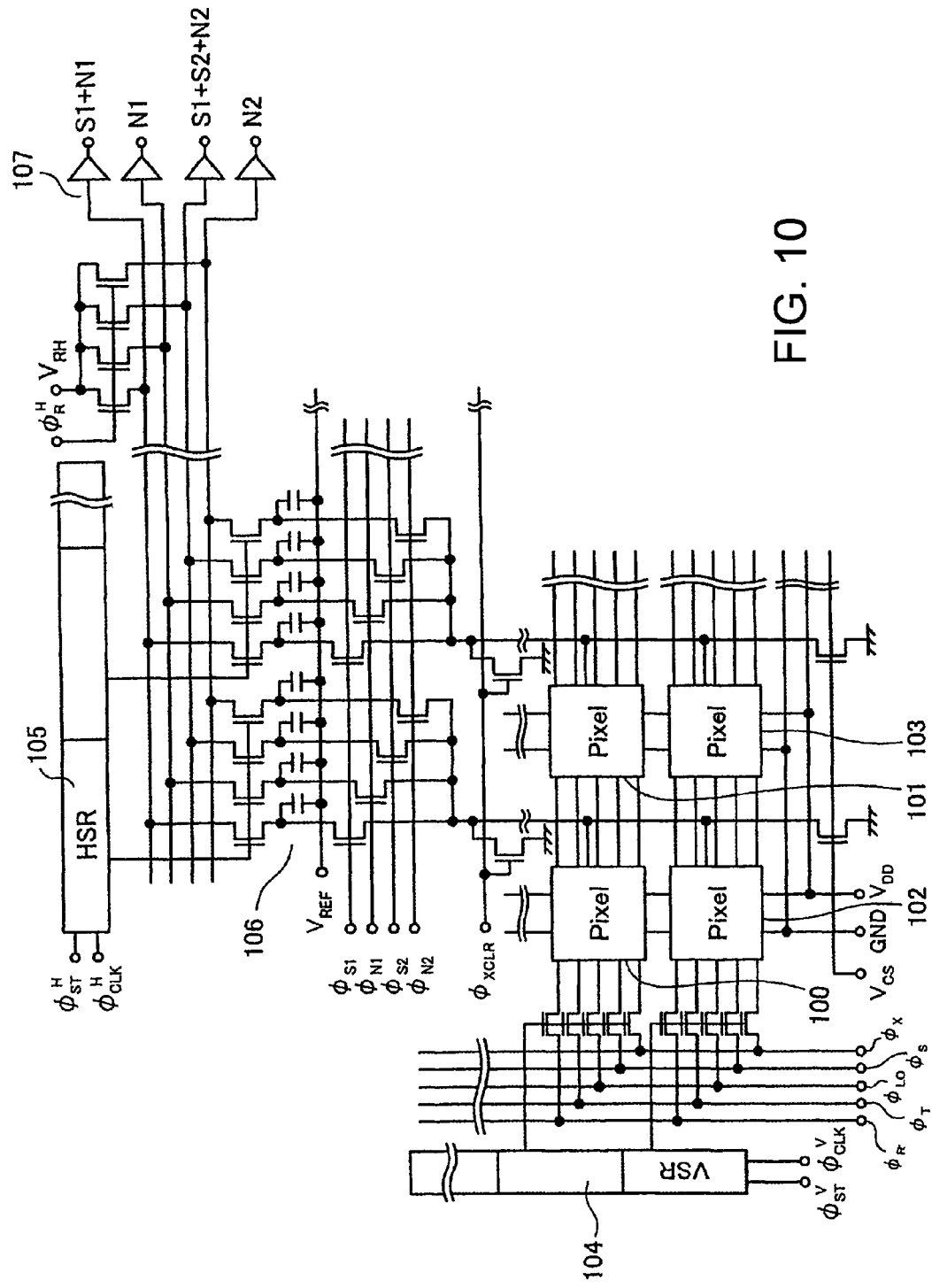
FIG. 10 is a block diagram of the solid-state imaging device according to the first embodiment of the present invention.

FIG. 10 is a block diagram of the solid-state imaging device according to this embodiment. On the periphery of a two-dimensionally arranged pixel array 100-103, there are provided a row shift register (VSR) 104, column shift register (HSR) 105, signal/noise hold section 106, and output circuit 107. Here, for simplicity, an example of pixel array of (2 pixels×2 pixels) is illustrated, but the number of pixels is not limited.

Signals that are point-sequentially read from each pixel, are noise signal N1, and (optical signal before saturation, subjected to charge/voltage conversion in FD)+(noise signal), i.e., (S1+N1); noise signal N2, and (added optical signal before and after saturation, subjected to charge/voltage conversion in FD and CS)+(noise signal), i.e., (S1+S2+N2). By a subtraction circuit, noise removal operation with respect to signal before saturation: [(S1+N1)−N1] is performed. This removes both of a random noise component and fixed pattern noise component. On the other hand, the noise N2 on the supersaturation side is read immediately after the start of storage, and hence, when a random noise component and fixed pattern noise components are both to be removed, the noise N2 is once stored in a frame memory, and thereafter, the noise removal operation: [(S1+N1)−N1] is performed by the subtraction circuit. Thus, the signal S1 before saturation, and the supersaturation-side signal (S1+S2) each of which is cleared of noise, can be obtained. Each of the subtraction circuit and frame memory may be either formed on an image sensor chip or formed as a separate chip.

Letting the capacities of the floating region FD and storage capacitor CS be $C_{FD}$ and $C_{CS}$, respectively, then the enlargement ratio of dynamic range can roughly be represented by $(C_{FD}+C_{CS})/C_{FD}$. In actuality, however, compared with the case of resetting the floating region FD, in the case of resetting the (FD+CS), clock feed-through at the reset transistor R has less influence, and the saturation voltage of the supersaturation-side signal S2 becomes higher than that of the signal S1 before saturation, so that the dynamic range enlarges at an enlargement ratio larger than that at the above-described ratio. In order to effectively extend the dynamic range without increasing the pixel size while maintaining a high numerical aperture of the photodiode, it is desired that a large storage capacitance with high area efficiency can be formed.

The synthesis of a wide dynamic range signal can be achieved by selecting either one of the signal S1 before saturation and supersaturation-side signal, (S1+S2), each of which is cleared of noise. The selection between S1 and (S1+S2) can be attained by, after having compared a S1/(S1+S2) switching reference voltage preset and the signal output voltage of S1, selecting either one of the signal S1 and (S1+S2). It is recommendable to set the switching reference voltage to be lower than S1 saturation voltage to prevent the switching reference voltage from being affected by variations in the saturation voltage of the signal S1 before saturation, and simultaneously, set to a high voltage such as to maintain a high S/N ratio of the supersaturation-side signal, (S1+S2) in the switching point. Here, multiplying a gain of the supersaturation-side signal, (S1+S2) by the ratio $(C_{FD}+C_{CS})/C_{FD}$ allows this gain to be conformed to the gain of the signal S1 before saturation. Thus, it is possible to acquire image signals with a dynamic range enlarged by selectively combining signals that are linear from a low illuminance up to high illuminance.

As is evident from the above-described operations, in the present solid-state imaging device, since signal charges before saturation and those of the supersaturation-side are mixed into the supersaturation-side signal (S1+S2), the signal (S1+S2) includes, at the minimum, signal charges near PD saturation of the signal S1 before saturation. This enhances the tolerance to noise components such as reset noise and low dark currents on the supersaturation side. Taking advantage of the enhancement of the noise tolerance to supersaturation-side (S1+S2) signal, a sufficient S/N ratio can be ensured even in the vicinity of the point of selection switching between signal before saturation and supersaturation-side signal, by reading a potential immediately after the reset of the floating region FD and storage capacitor CS in a subsequent field, as N2', and taking the different with respect to (S1+S2+N2) in a preceding field (i.e., (S1+S2+N2)−N2') to remove a fixed pattern noise component.

The reading operation of the signal (S1+N1) before saturation, and the noise signal N1 involves the removal of floating region (FD) reset noise, and the correction of variations in the threshold voltage of source follower amplifier are performed, so that, in the low-illuminance region, a high sensitivity and high S/N ratio (low noise) property can be implemented without occurrence of afterimage. In operations on the supersaturation side, after having stored charges overflowing the photodiode PD in the storage capacitor CS via the overflow gate LO in the same storage period, the signal reading on the low-illuminance side is performed. After the completion of the reading, at a time $t_8$, signal charges before saturation remaining in the floating region FD are mixed with supersaturation signal charges, and the mixed charges are read. Furthermore, at this time $t_8$, upon switching-on of the storage transistor S, the floating region FD is connected to the storage capacitor CS having a large capacitance and the potentials of (FD+CS) heads to the positive direction. Therefore, the photocharges of the photodiode PD are completely transferred with high efficiency to the (FD+CS) even if the photodiode PD is in a saturated state, so that no afterimage occurs even in the vicinity of PD saturation.

Moreover, even when the storage capacitor CS becomes saturated, excess charges can efficiently be discharged to a power supply VDD by adjusting threshold voltages of the reset transistor R and storage transistor S, so that, blooming can be suppressed even when an p type silicon semiconductor substrate is used. Here, the low-side potential of the reset transistor R and storage transistor S may be set to a higher value than the zero potential.

In this way, in the low-illuminance imaging in which the photodiode PD is unsaturated, a high-sensitivity and high S/N ratio can be maintained by the charge signals (S1) before saturation, obtained by canceling noises. Furthermore, in the high-illuminance imaging in which the photodiode PD is saturated, photocharges overflowing the photodiode PD are captured by storing them in the storage capacitor CS, and a high S/N ratio can be maintained to thereby realize a wide dynamic range on the high-illuminance side by signals obtained by likewise canceling noises, i.e., the sum of charge signal before saturation and supersaturation charge signal, (S1+S2).

As described above, the solid-state imaging device according to this embodiment increases the sensitivity on the high-illuminance side without reducing the sensitivity on the low-illuminance side to thereby achieve a wide range, and in addition, it does not use a power supply voltage exceeding the commonly-used range. This allows the present solid-state imaging device to address the miniaturization of image sensor in the future. Moreover, because the addition of elements is reduced to a minimum, there is no possibility of incurring an increased pixel size.

Furthermore, unlike the conventional image sensor implementing a wide dynamic range, the present embodiment stores photocharges in the same storage period without dividing the storage period between the high-illuminance side and low-illuminance side, namely, without straddling frames. This prevents the deterioration of image quality even in the imaging of moving images.

Moreover, regarding leak currents from the floating region FD, in the image sensor according to this embodiment, minimum signals of (S1+S2) becomes saturated charges from the photodiode PD, so that the image sensor comes to treat a charge amount larger than that of the lead currents from the flowing region FD. This offers an advantage of making the image sensor impervious to the FD leakage.

Second Embodiment

Figure 11:
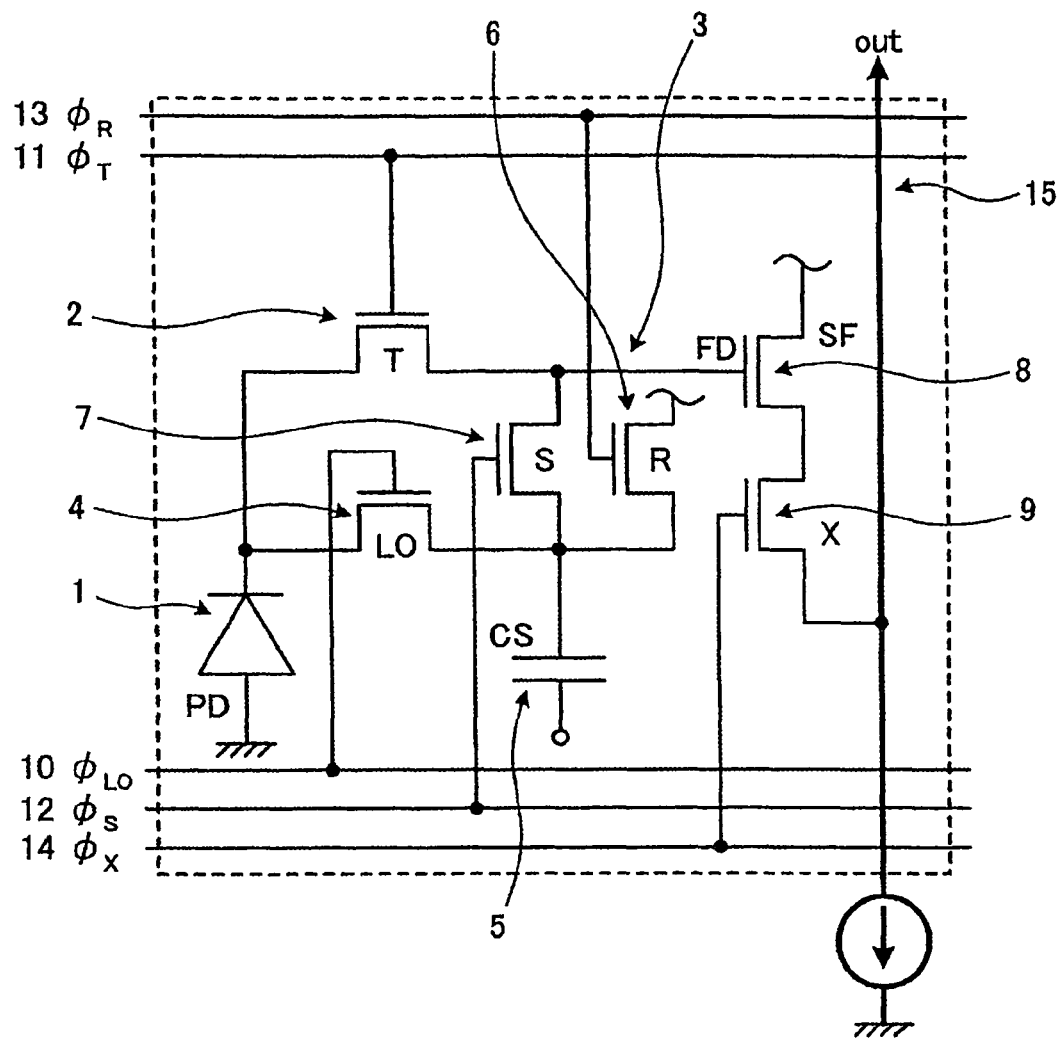
FIG. 11 is an equivalent circuit diagram of a pixel in a solid-state imaging device according to a second embodiment of the present invention.
Figure 12:
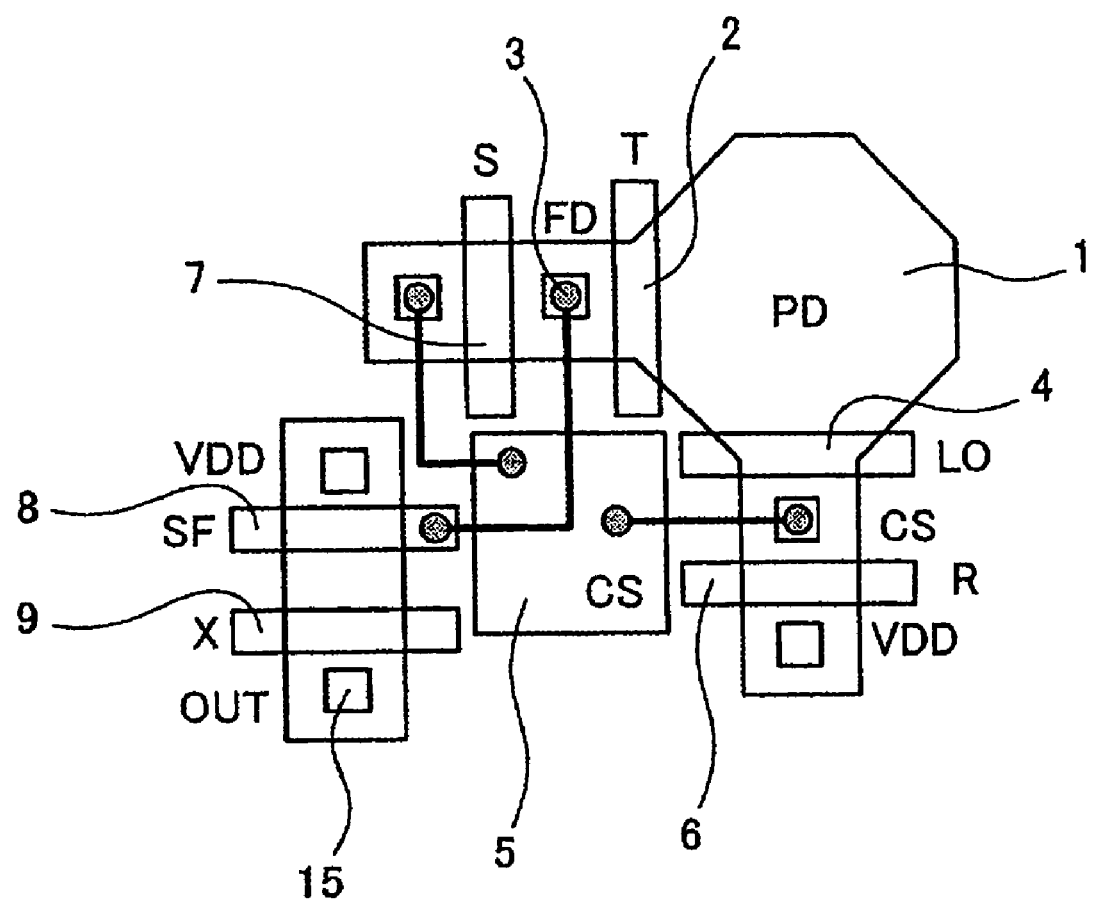
FIG. 12 is a schematic plan view of the pixel in the solid-state imaging device according to the second embodiment of the present invention.

The solid-state imaging device according to this embodiment is one in which the circuit configuration of the pixel in the solid-state imaging device according to the first embodiment is modified. FIG. 11 is an equivalent circuit diagram of one pixel in this embodiment, and FIG. 12 is a schematic plan view thereof.

Each pixel comprises: a photodiode PD1 that receives light and that produces and stores photocharges; a transfer transistor T2 provided adjacently to the photodiode PD1 and transferring the photocharges; a floating region FD3 connected to the photodiode PD1 via the transfer transistor T2; an overflow gate LO4 provided adjacently to the photodiode PD1 and transferring photocharges that overflow the photodiode PD1 during a storage operation; a storage capacitor CS5 that stores photocharges overflowing the photodiode PD1 through the overflow gate LO4 during the storage operation; a reset transistor R6 connected to the storage capacitor CS5, for discharging signal charges in the storage capacitor CS5 and the floating region FD3; a storage transistor S7 provided between the floating region FD3 and the storage capacitor CS5; an amplification transistor SF8 for reading signal charges of the floating region FD3, or those of both of the floating region FD3 and the storage capacitor CS5, as voltages; and a selection transistor X9 connected to the amplification transistor SF8, for selecting the pixel or a pixel block.

As in the case of the above-described first embodiment, in the solid-state imaging device according to this embodiment, a plurality of pixels, each having the above-described arrangement, is stored in two-dimensional or one-dimensional array. In each pixel, drive lines $\phi_{LO}$ 10, $\phi_T$ 11, $\phi_S$ 12, and $\phi_R$ 13, respectively, are connected to gate electrodes of the overflow gate LO4, transfer transistor T2, storage transistor S7, and reset transistor R6. Also, a pixel selection line $\phi_X$ 14 driven by a row shift register is connected to a gate electrode of the selection transistor X9. Furthermore, an output line OUT15 is connected to the output side source of the selection transistor X9, and controlled by a column shift register to produce an output.

As in the case of the above-described first embodiment, the construction of the solid-state imaging device according to this embodiment is not limited, as long as the voltage of the floating region FD3 can be fixed to an appropriate value so as to be able to perform selection operations or non-selection operations of pixels. Therefore, the selection transistor X9 and drive line $\phi_X$ 14 may also be omitted.

In the solid-state imaging device according to the present embodiment, its schematic sectional view representing the regions of the photodiode PD1, overflow gate LO4, and storage capacitor CS5 in a pixel is the same as FIG. 8A shown in the first embodiment, and hence, it is omitted from depiction to avoid duplication. Furthermore, the schematic sectional view of the present solid-state imaging device, representing the regions of a photodiode PD1, transfer transistor T2, floating region FD3, storage transistor S7, and storage capacitor CS5 in the pixel, is the same as FIG. 8B, and hence, it is omitted from depiction, as well.

Figure 13:
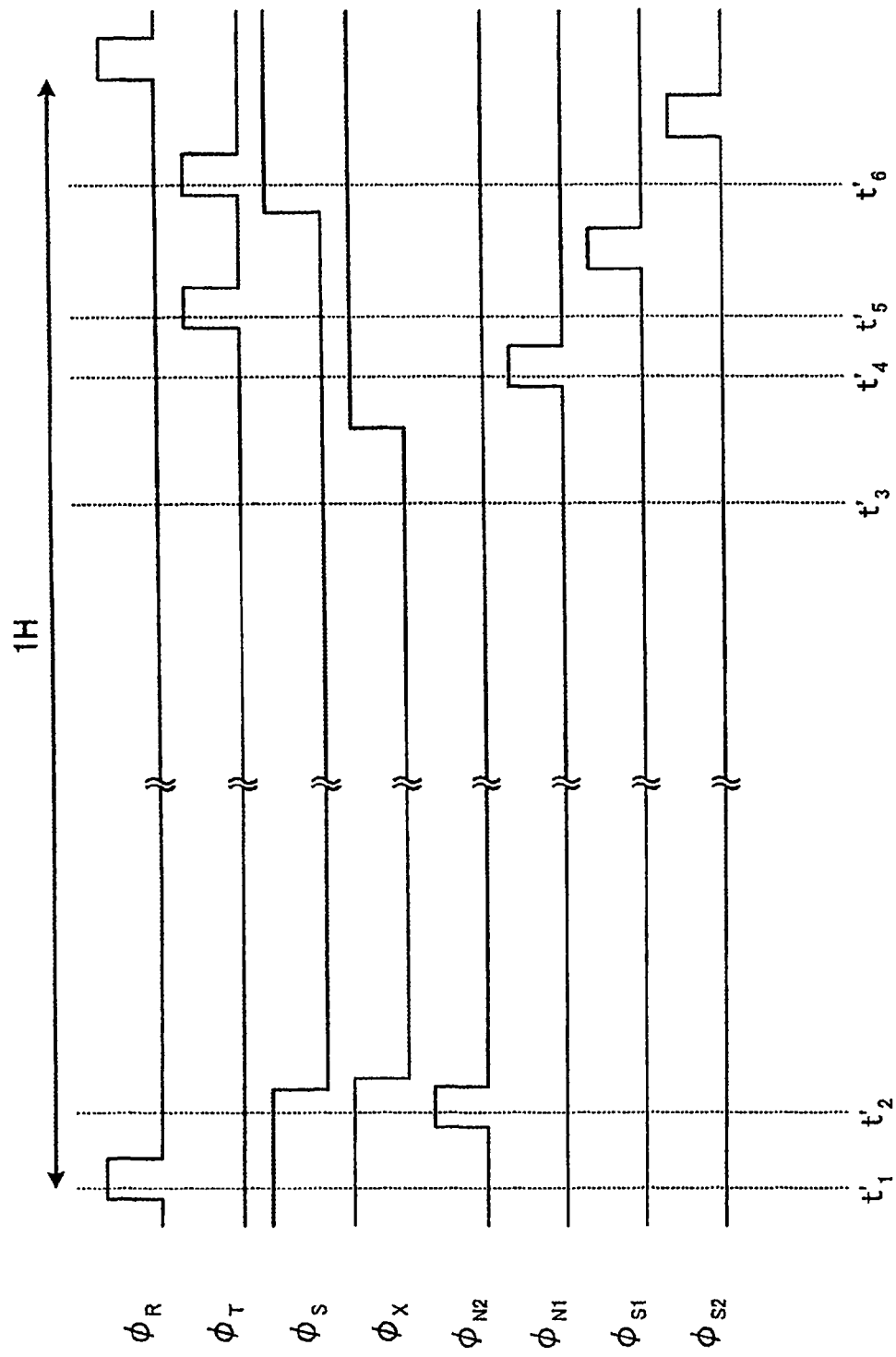
FIG. 13 is a drive timing diagram of the solid-state imaging device according to the second embodiment of the present invention.

Here, description is made of an operating method for the solid-state imaging device according to this embodiment shown in FIGS. 11 and 12. FIG. 13 is a drive timing diagram for the solid-state imaging device according to this embodiment.

First, prior to storage, the storage transistor S is set to on, and the transfer transistor T and reset transistor R are set to off. At this time, the photodiode PD is in a completely depleted state.

Next, the reset transistor R is switched on, to reset the floating region FD and storage capacitor CS (time: $t_1'$). Then, reset noises of (floating region FD+storage capacitor CS) captured immediately after the reset transistor R has been switched off, are read as noise signals N2 (time: $t_2'$). Here, the noise signals N2 include variations in the threshold voltage of the amplification transistor SF, as a fixed pattern noise component. During storage period (time: $t_3'$), in a state where the storage transistor S, transfer transistor T, reset transistor R, and selection transistor X are switched off, photocharges before saturation are stored by the photodiode PD, and excess photocharges when the saturation is exceeded, are stored in the storage capacitor CS via the overflow gate LO. This operation allows charges overflowing the photodiode PD to be effectively used without being thrown away. In this manner, in both periods before and after saturation, storage operations are performed by receiving light by the same photodiode PD for each pixel in the same storage period.

After the storage has been completed (time: $t_4'$), the selection transistor X is switched on, and then the noise signals stored in the photodiode PD are read. Here, the noise signals N1 include variations in the threshold voltage of the amplification transistor SF, as a fixed pattern noise component. Next, the transfer transistor T is switched on, to completely transfer optical signals stored in the photodiode PD to the floating region FD (t: $t_5'$), and the signals are read as (S1+N1). Then, the storage transistor S is also switched on (time: $t_6'$), and signal charges stored in the photodiode PD are completely transferred to the floating region FD and storage capacitor CS. Here, charges stored in the photodiode PD, floating region FD, and storage capacitor CS are mixed, and the signals are read as (S1+S2+N2).

In the first embodiment, a portion of the noise signals N2 stored in the floating region FD and storage capacitor CS is threw away at a the time $t_6$ during the reset operation of the floating region FD. The amount of the signals thrown away at this time is $CFD//(C_{FD}+C_{CS})$ times larger than the noise signals stored the floating region FD and storage capacitor CS. In contrast, in the solid-state imaging device according to this embodiment, there is no possibility that a portion of noise signals will be thrown away.

The block diagram of the solid-state imaging device according to this embodiment is the same as FIG. 10 shown in the first embodiment, and hence it is omitted from depiction to avoid duplication. Signals point-sequentially read from each pixel, the enlargement ratio of dynamic range, and the synthesis of a wide dynamic range signal in the embodiment are the same as those described in the first embodiment.

As in the case of the first embodiment, the solid-state imaging device according to this embodiment increases the sensitivity on the high-illuminance side without reducing the sensitivity on the low-illuminance side to achieve a wide range, and in addition, it does not use a power supply voltage exceeding the commonly-used range. This allows the present solid-state imaging device to address the miniaturization of image sensor in the future. Moreover, because the addition of elements is reduced to a minimum, there is no possibility of incurring the increase in pixel size.

Furthermore, unlike the conventional image sensor implementing a wide dynamic range, the present embodiment stores photocharges in the same storage period without dividing the storage period between the high-illuminance side and low-illuminance side, namely, without straddling frames. This prevents the deterioration of image quality even in the imaging of moving images.

Moreover, regarding leak currents from the flowing region FD, in the image sensor according to this embodiment, a minimum signal that is read by the capacities of the floating region FD and storage capacitor CS, i.e., $(C_{FD}+C_{CS})$ becomes (supersaturated charges)+(saturated charges from the photodiode PD), so that the image sensor comes to treat a charge amount larger than that of the leak currents of the floating region FD. This offers an advantage of making the image sensor impervious to the FD leakage.

Third Embodiment

Figure 14:
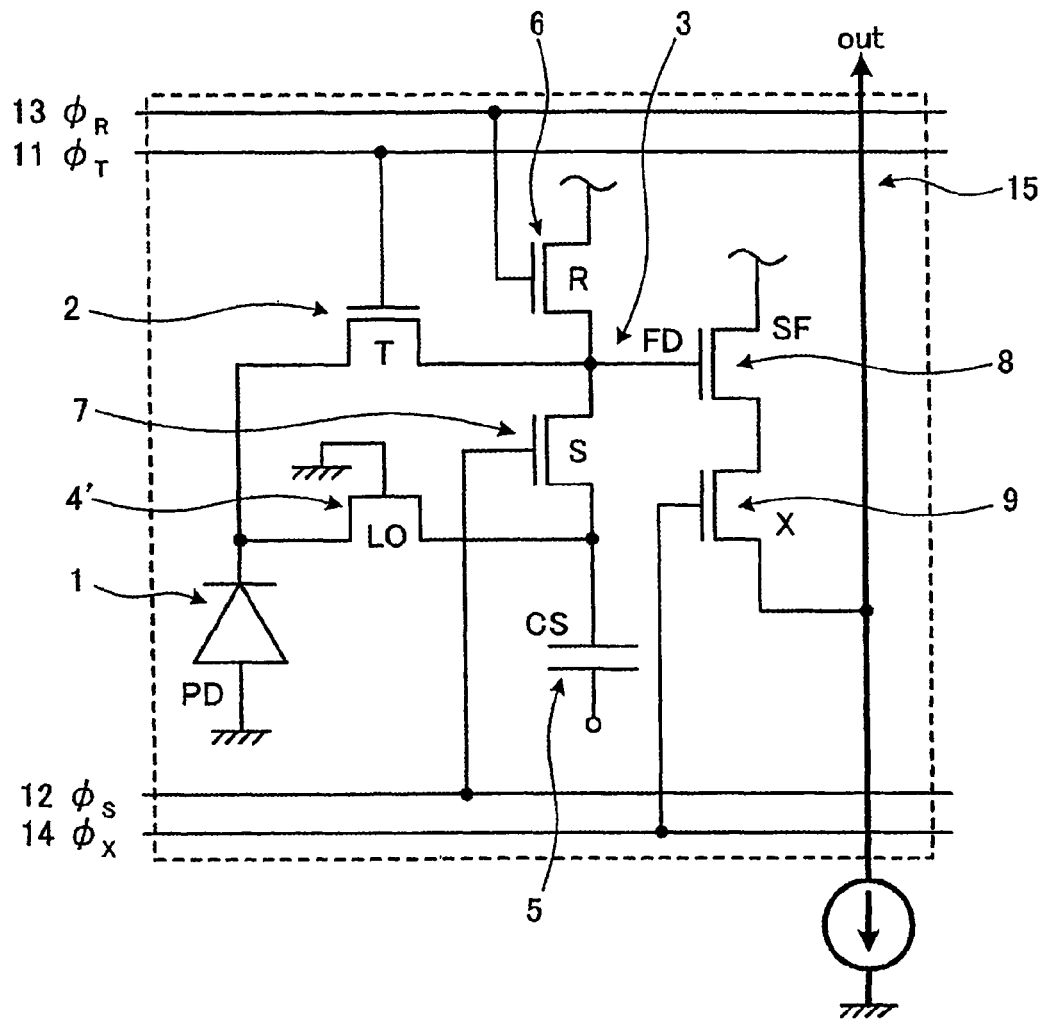
FIG. 14 is an equivalent circuit diagram of a pixel in a solid-state imaging device according to a third embodiment of the present invention, this equivalent circuit diagram corresponding to that of the first embodiment.
Figure 15:
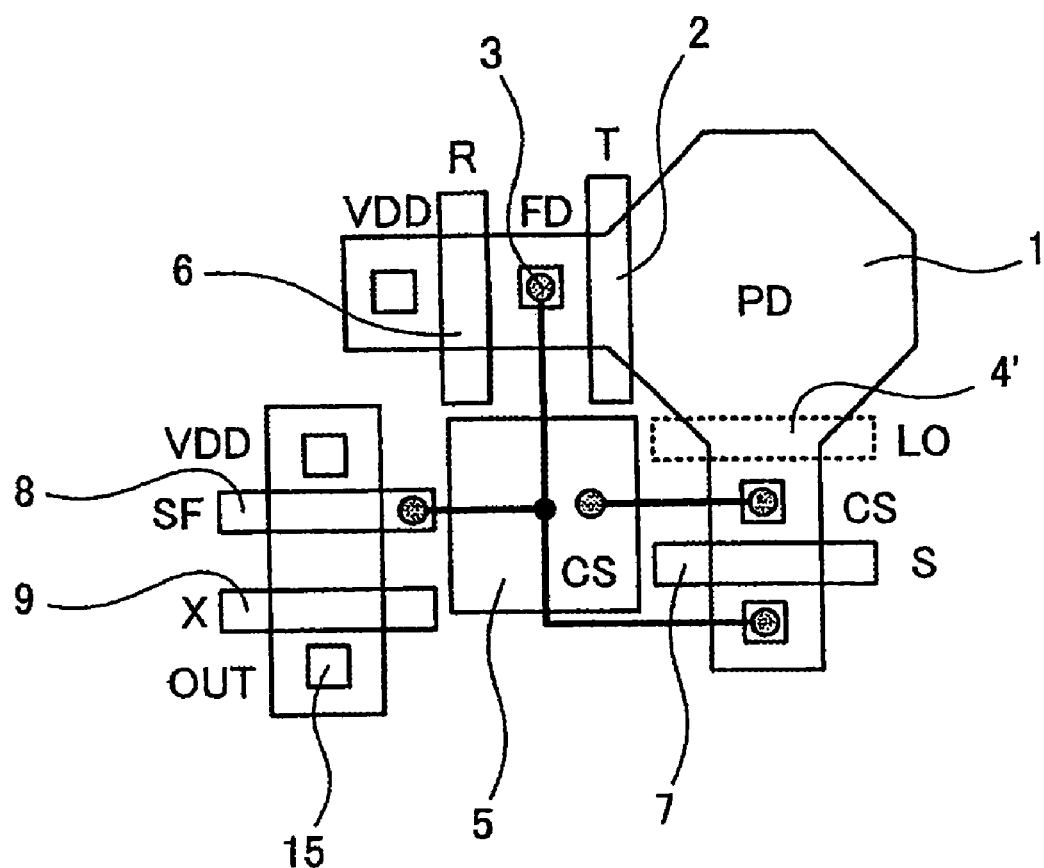
FIG. 15 is a schematic plan view of the pixel in the solid-state imaging device according to the third embodiment of the present invention, this plan view corresponding to that of the first embodiment.
Figure 16:
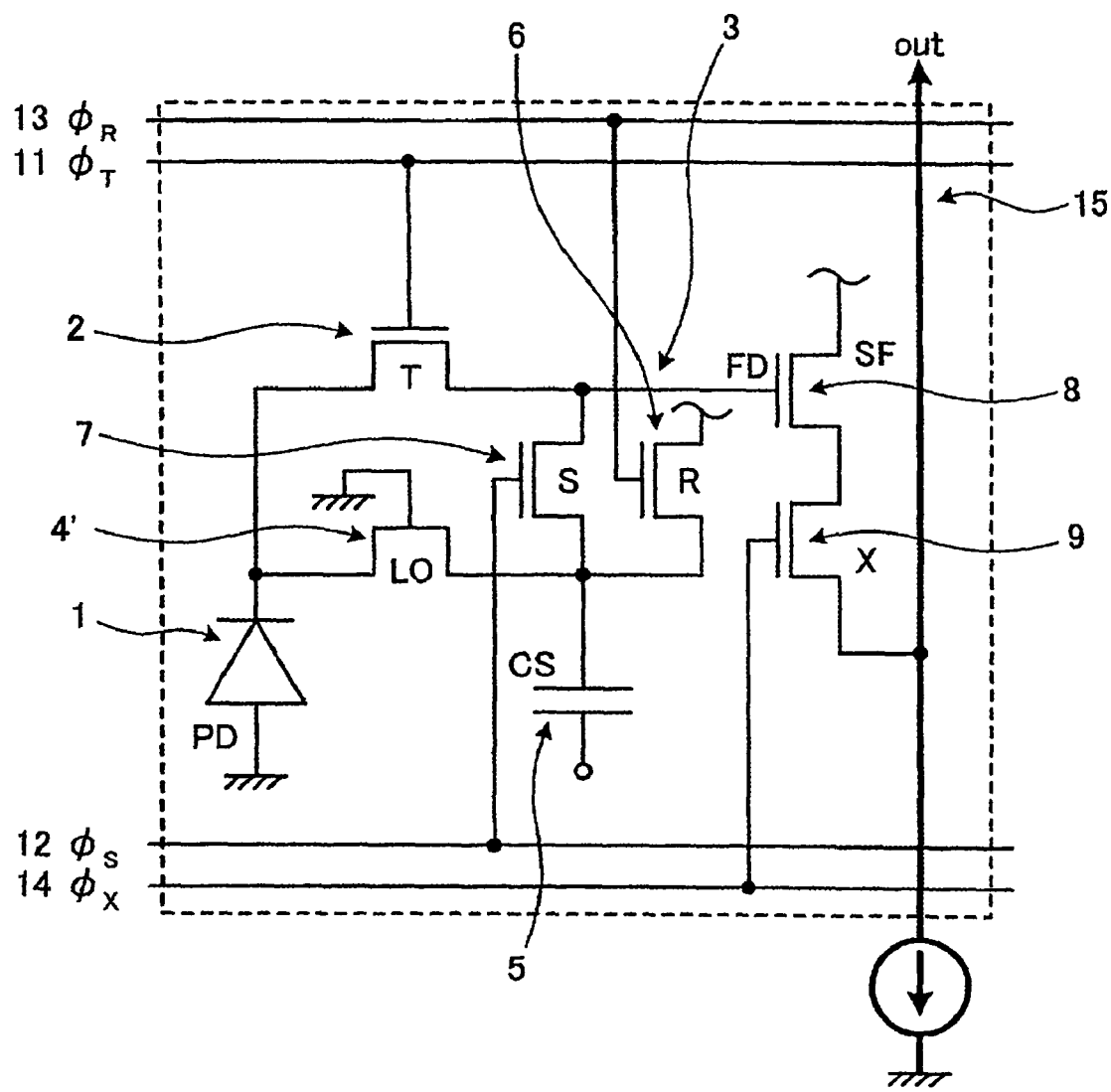
FIG. 16 is an equivalent circuit diagram of the pixel in the solid-state imaging device according to the third embodiment of the present invention, this equivalent circuit diagram corresponding to that of the second embodiment.
Figure 17:
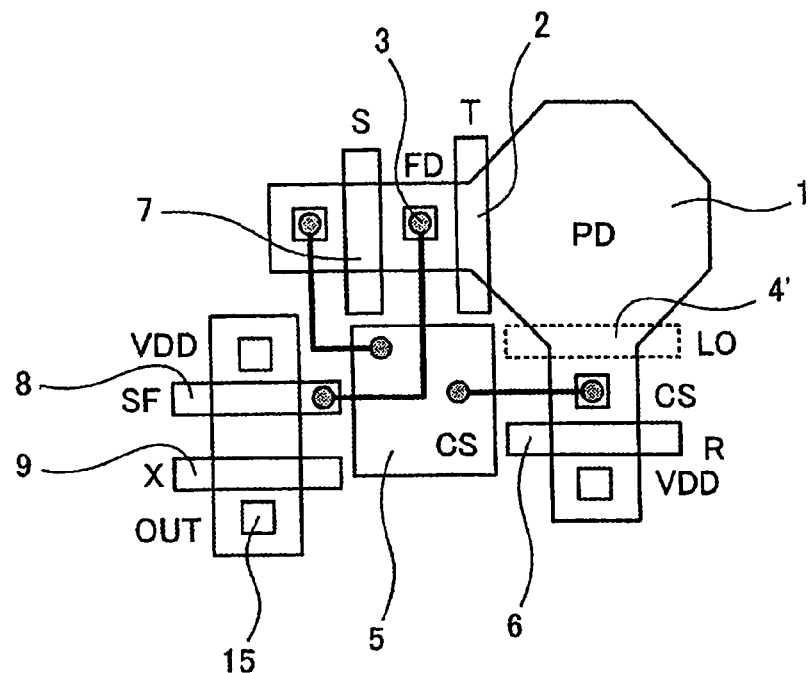
FIG. 17 is a schematic plan view of the pixel in the solid-state imaging device according to the third embodiment of the present invention, this plan view corresponding to that of the second embodiment.

The solid-state imaging device according to this embodiment is one in which the overflow gates of the pixels in the solid-state imaging device according to the first and second embodiments of the present invention are modified. FIGS. 14 and 15, respectively, are an equivalent circuit diagram and schematic plan view of a pixel in this embodiment, these figures corresponding to the respective figures of the first embodiment. Also, FIGS. 16 and 17, respectively, are an equivalent circuit diagram and schematic plan view of a pixel in this embodiment, these figures corresponding to the respective figures of the second embodiment.

Each pixel comprises: a photodiode PD1 that receives light and that produces and stores photocharges; a transfer transistor T2 provided adjacently to the photodiode PD1 and transferring the photocharges; a floating region FD3 connected to the photodiode PD1 via the transfer transistor T2; an overflow gate LO4' provided adjacently to the photodiode PD1 and transferring photocharges that overflow the photodiode PD1 during a storage operation; a storage capacitor CS5 that stores photocharges overflowing the photodiode PD1 through the overflow gate LO4' during the storage operation; a reset transistor R6 connected to the storage capacitor CS 5, for discharging signal charges in the floating region FD3 (FIG. 14) or the storage capacitor CS5 (FIG. 16); a storage transistor S7 provided between the floating region FD3 and the storage capacitor CS5; an amplification transistor SF8 for reading signal charges of the floating region FD3, or those of both of the floating region FD3 and the storage capacitor CS5, as voltages; and a selection transistor X9 connected to the amplification transistor SF8, for selecting the pixel or a pixel block.

As in the cases of the above-described first and second embodiments, in the solid-state imaging device according to this embodiment, a plurality of pixels, each having the above-described arrangement, is stored in two-dimensional or one-dimensional array. In each pixel, drive lines $\phi_T$ 11, $\phi_S$ 12, and $\phi_R$ 13, respectively, are connected to gate electrodes of the transfer transistor T2, storage transistor S7, and reset transistor R6. Also, a pixel selection line $\phi_X$ 14 driven by a row shift register is connected to a gate electrode of the selection transistor X9. Furthermore, an output line OUT15 is connected to the output side source of the selection transistor X9, and controlled by a column shift register to produce an output.

As in the case of the above-described first embodiment, the construction of the solid-state imaging device according to this embodiment is not limited, as long as the voltage of the floating region FD3 can be fixed to an appropriate value so as to be able to perform a selection operation or non-selection operation of a pixel. Therefore, the selection transistor X9 and drive line $\phi_X$ 14 may also be omitted.

Figure 18:
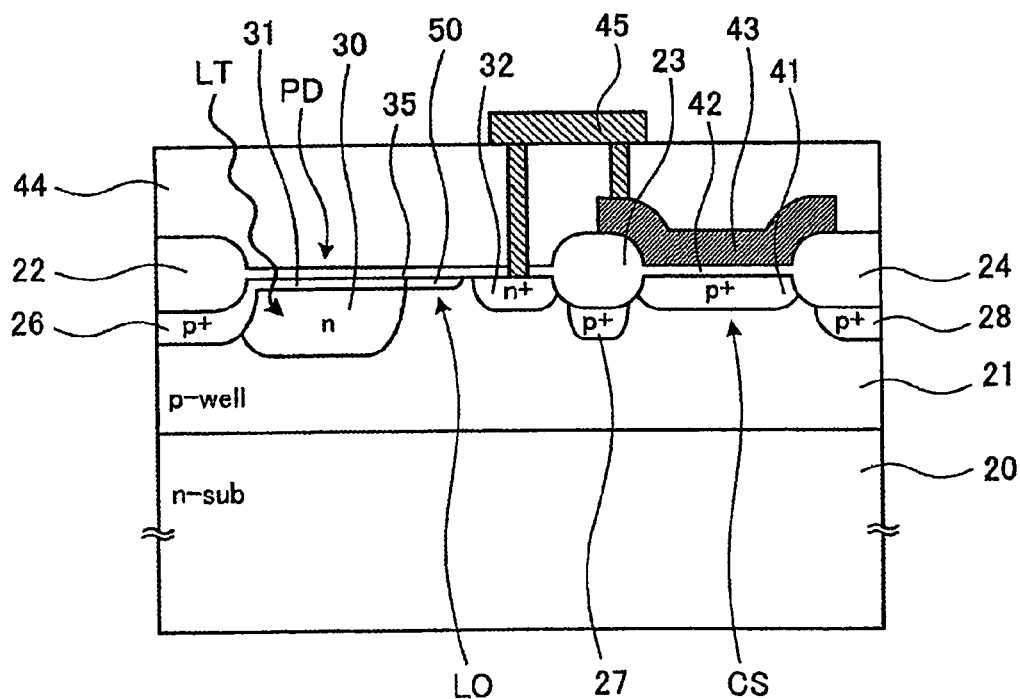
FIG. 18 is a sectional view of the pixel in the solid-state imaging device according to the third embodiment of the present invention.

FIG. 18 is a schematic sectional view of a photodiode PD1, overflow gate LO4, and storage capacitor CS5 in a pixel in the solid-state imaging device according to the third embodiment. Here, in the regions associated with the n type semiconductor region 30 and n+type semiconductor region 32, a p+semiconductor region 50 is formed on the top surface of the p type well 21, and a joint transistor type overflow gate LO is constituted, with the n type semiconductor region 30 and n+type semiconductor region 32 as a source/drain, and with the p+semiconductor region 50 as a gate. Other constructions are the same as those in the above-described first embodiment. Here, the p+semiconductor region 50 is electrically connected to the p+semiconductor region 31 and p type well 21.

The operating method for the solid-state imaging device according to this embodiment is the same as that in the first and second embodiments. The block diagram of the solid-state imaging device according to this embodiment is the same as FIG. 10 shown in the first embodiment, and hence it is omitted from depiction to avoid duplication. Signals point-sequentially read from each pixel, the enlargement ratio of dynamic range, and the synthesis of a wide dynamic range signal in the embodiment are the same as those described in the first embodiment.

The solid-state imaging device according to this embodiment exerts effects similar to those in the first and second embodiments, and in addition, since the p+semiconductor region 50 is electrically connected to the p+semiconductor region 31 and p type well 21, the solid-state imaging device according to this embodiment allows the number of wiring lines of drive signals to be reduced, and high-density pixels to be achieved, as compared with the first and second embodiments.

Fourth Embodiment

The solid-state imaging device according to this embodiment is one that is configured so as to be able to more smoothly move charges overflowing the photodiode during the storage of charges than in the above-described third embodiment.

Figure 19:
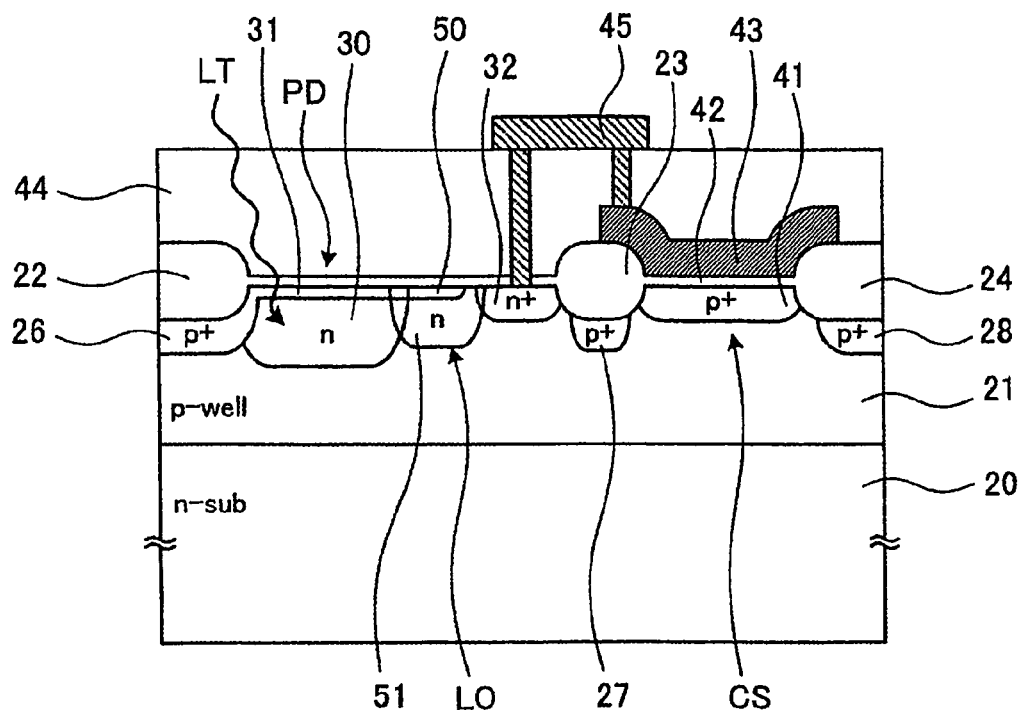
FIG. 19 is a sectional view of a pixel in a solid-state imaging device according to a fourth embodiment of the present invention.

FIG. 19 is a sectional view of an example of solid-state imaging device in which the overflow gate LO is a buried channel transistor that has a semiconductor layer of the same conductive type as a channel of the transfer transistor formed up to a predetermined depth from the surface or the vicinity of the surface of a substrate constituting the transfer transistor. FIG. 19 represents the regions of the photodiode PD, overflow gate LO, and storage capacitor CS.

Here, an n type semiconductor region 51 is formed so as to overlap the n type semiconductor region 30 and n+type semiconductor region 32, from the surface or the vicinity of the surface of a substrate below the p+semiconductor region of the overflow gate LO up to a predetermined depth. The n type semiconductor region 51 is an n type region, which is lower in the effective concentration of impurities than the n type semiconductor region 30 and n+type semiconductor region 32.

The above-described construction contributes to lowering a potential barrier between the photodiode PD and storage capacitor CS. This allows charges overflowing the photodiode PD to be smoothly moved to the storage capacitor CS during the storage of charges.

Figure 20:
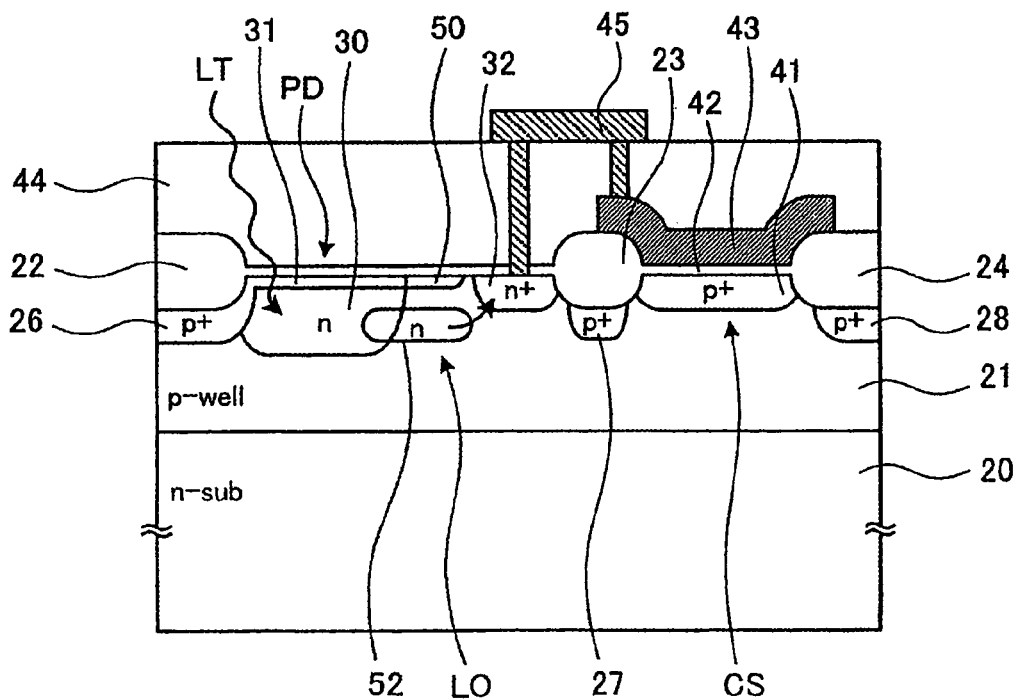
FIG. 20 is a sectional view of the pixel in the solid-state imaging device according to the fourth embodiment of the present invention.
Figure 21:
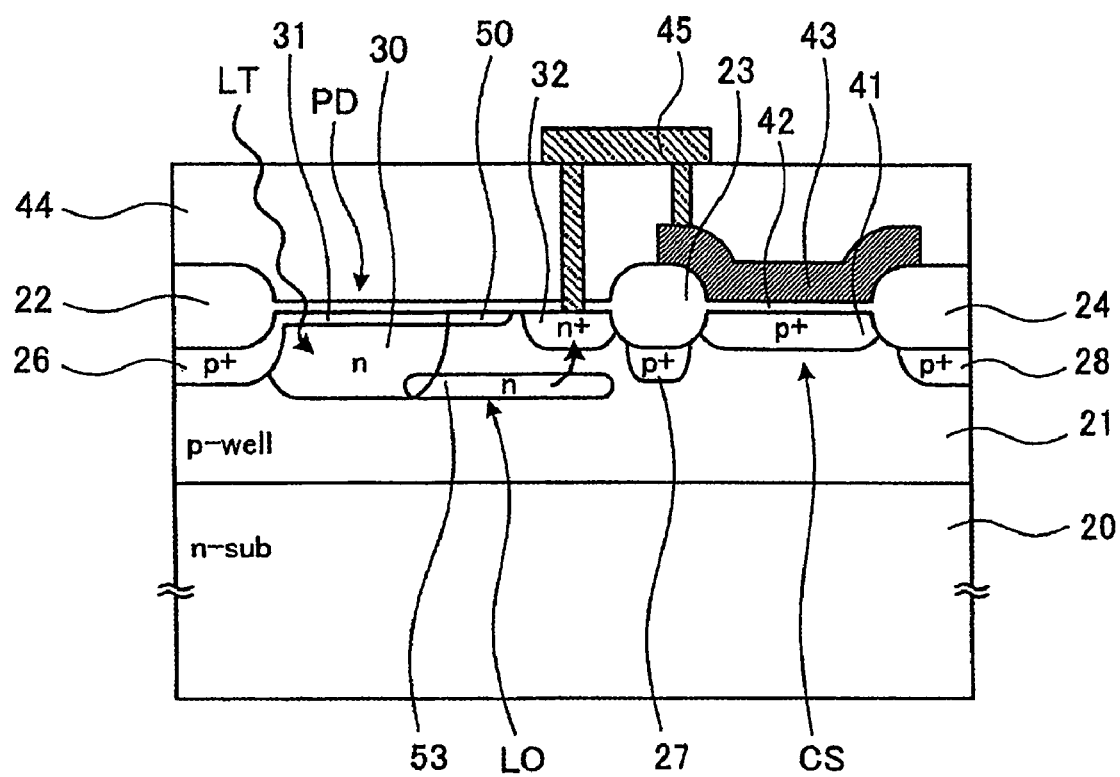
FIG. 21 is a sectional view of the pixel in the solid-state imaging device according to the fourth embodiment of the present invention.

The solid-state imaging device shown in FIGS. 20 and 21 is configured so as to have a semiconductor layer that is formed in parallel with a portion below the gate of the overflow gate LO at a predetermined depth of a substrate, and that reduces a barrier to punch through between the photodiode PD and storage capacitor CS.

FIG. 20 is a sectional view of an example of solid-state imaging device according to this embodiment, representing the regions of the photodiode PD, overflow gate LO, and storage capacitor CS. Here, in a region at a predetermined depth below the gate electrode 50 of the overflow gate LO, an n type semiconductor region 52 is formed so as to connect with the n type semiconductor region 30.

The above-described construction contributes to lowering a barrier to punch-through in the overflow gate LO. The route of punch-through in an oblique direction from the n type semiconductor region 52 to the n+type semiconductor region 32 constitutes an overflow path from the photodiode PD to the storage capacitor CS, thereby allowing charges overflowing the photodiode PD to punch through to thereby smoothly move the charges to the storage capacitor CS during the storage of charges.

FIG. 21 is a sectional view of example of solid-state imaging device according to this embodiment. As in the case of the solid-state imaging device shown in FIG. 20, in a region at a predetermined depth below the gate electrode 50 of the overflow gate LO, an n type semiconductor region 53 is formed to connect with the n type semiconductor region 30. In this embodiment, the n type semiconductor region 53 is further extended down to below the n+type semiconductor region 32.

The above-described construction contributes to lowering a barrier to punch-through in the overflow gate LO. The route of punch-through in a substantially vertical direction from the n type semiconductor region 53 to the n+type semiconductor region 32 constitutes an overflow path from the photodiode PD to the storage capacitor CS, thereby allowing charges overflowing the photodiode PD to punch through to thereby smoothly move the charges to the storage capacitor CS during the storage of charges.

Fifth Embodiment

Figure 22:
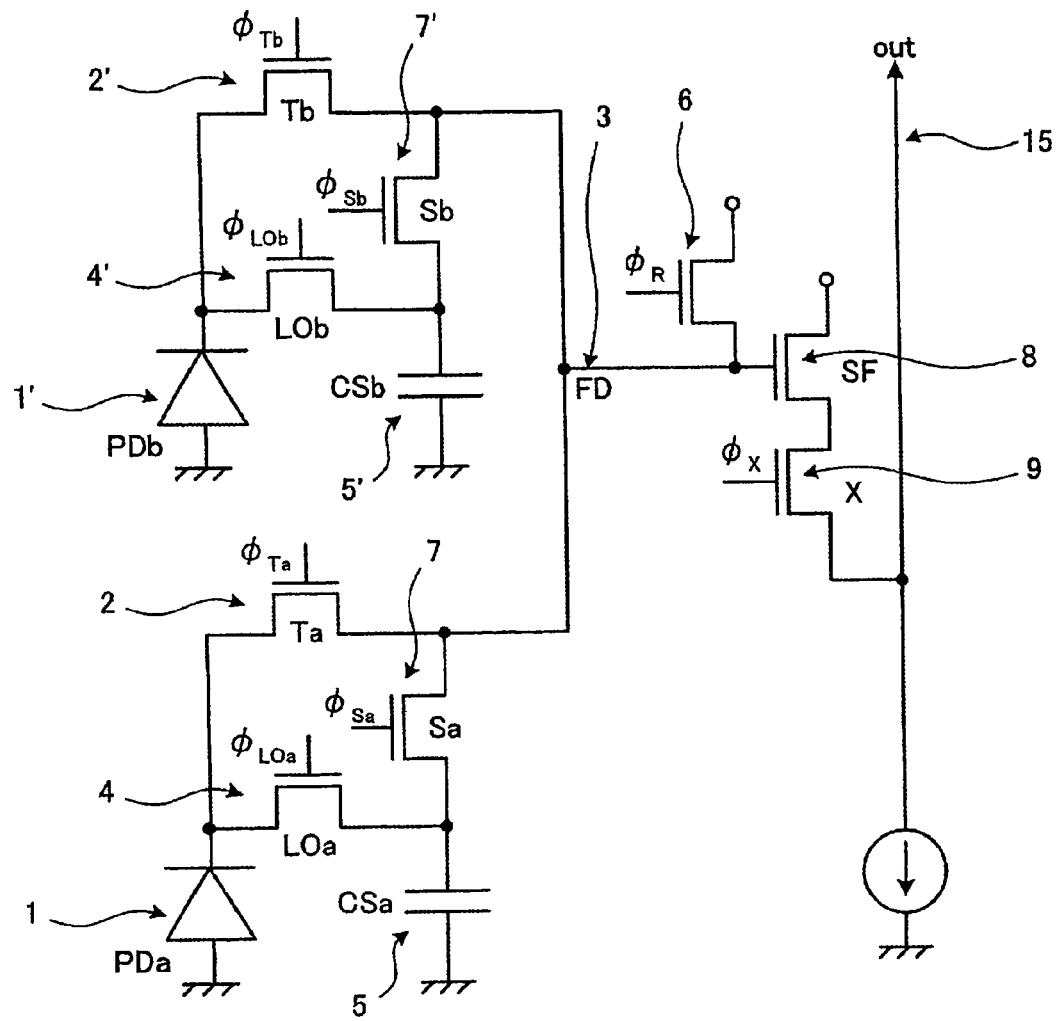
FIG. 22 is an equivalent circuit diagram of two pixels in a solid-state imaging device according to a fifth embodiment of the present invention.
Figure 23:
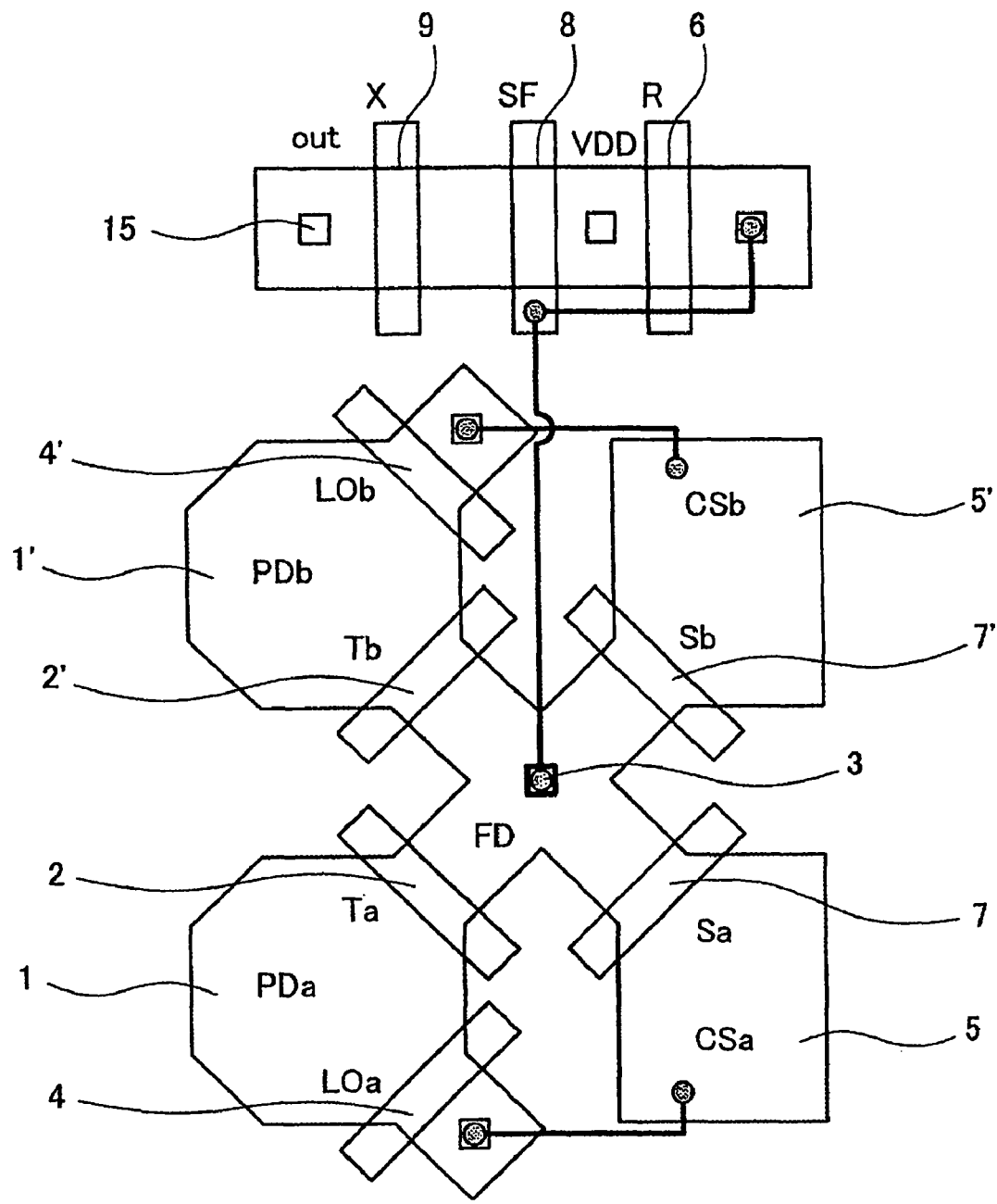
FIG. 23 is a schematic plan view of the two pixels in the solid-state imaging device according to the fifth embodiment of the present invention.

The solid-state imaging device according to this embodiment is one in which the circuit configuration in the solid-state imaging device according to the first embodiment is modified. FIG. 22 is an equivalent circuit diagram of two pixels in a solid-state imaging device according to the present embodiment, and FIG. 23 is a schematic plan view thereof.

The solid-state imaging device according to this embodiment is one having a pixel block composed of two pixels "a" and "b", as a basic unit, each pixel block including two diodes and two storage capacitors. Each pixel block comprises: photodiodes PDa1 and PDb1' that receive light and that produce and store photocharges; transfer transistors Ta2 and Tb2' that are provided adjacently to the photodiodes PDa1 and PDb1', respectively, and that transfer the photocharges; one floating region FD3 connected to the photodiodes PDa1 and PDb1' via the transfer transistors Ta2 and Tb2', respectively; overflow gates LOa4 and LOb4' that are provided adjacently to the photodiodes PDa1 and PDb1', respectively, for transferring photocharges overflowing the respective photodiodes PDa1 and PDb1' during a storage operation; storage capacitors CSa5 and CS b5' that store photocharges overflowing the photodiodes PDa1 and PDb1', respectively, through the respective overflow gate LOa4 and LOb4' during the storage operation; a reset transistor R6 connected to each of the storage capacitors CSa5 and CSb5', for discharging signal charges in the storage capacitors CSa5 and CSb5', and flowing region FD3; storage transistors Sa7 and Sb7' provided between the floating region FD3 and the storage capacitors CSa5 and CSb5'; an amplification transistor SF8 for reading signal charges of the floating region FD3, or each of signal charges of the floating region FD3 and the storage capacitor CSa5 and CSb5', as a voltage; and a selection transistor X9 connected to the amplification transistor SF8, for selecting the pixel or the pixel block. In this manner, the pixel block as a basic unit is configured to include two photodiodes, two storage capacitors, a floating region FD, an amplification transistor SF, reset transistor R, and a selection transistor X.

In the solid-state imaging device according to this embodiment, a plurality of the pixels with the above-described arrangement is stored in two-dimensional or one-dimensional array. In each pixel block, drive lines $\phi_{LOa}$, $\phi_{LOb}$, $\phi_{Ta}$, $\phi_{Tb}$, $\phi_{Sa}$, $\phi_{Sb}$, and $\phi_R$, respectively, are connected to gate electrodes of the overflow gate LOa4 and LOb4', transfer transistors Ta2 and Tb2', storage transistors Sa7 and Sb7', and reset transistor R6. Also, a pixel selection line $\phi_X$ driven by a row shift register is connected to a gate electrode of the selection transistor X9. Furthermore, an output line OUT15 is connected to the output side source of the selection transistor X9, and controlled by a column shift register to produce an output.

As in the case of the above-described first embodiment, the construction of the solid-state imaging device according to this embodiment is not limited, as long as the voltage of the floating region FD3 can be fixed to an appropriate value so as to be able to perform a selection operation or non-selection operation of a pixel. Therefore, the selection transistor X9 and drive line $\phi_X$ may also be omitted.

In the solid-state imaging device according to the present embodiment, its schematic sectional view representing the regions of the photodiodes PDa1 and PDb1', overflow gates LOa4 and LOb4', and storage capacitors CSa5 and CSb5' in the pixels "a" and "b" of a pixel block is similar to FIG. 8A shown in the first embodiment, and hence it is omitted from depiction to avoid redundancy. Furthermore, the schematic sectional view of the present solid-state imaging device, representing the regions of photodiodes PDa1 and PDb1', transfer transistors Ta2 and Tb2', floating region FD3, storage transistors Sa7 and Sb7', and storage capacitors CSa5 and CSb5' in the pixel is similar to FIG. 8B shown in the first embodiment, and hence it is omitted from depiction, as well.

Figure 24:
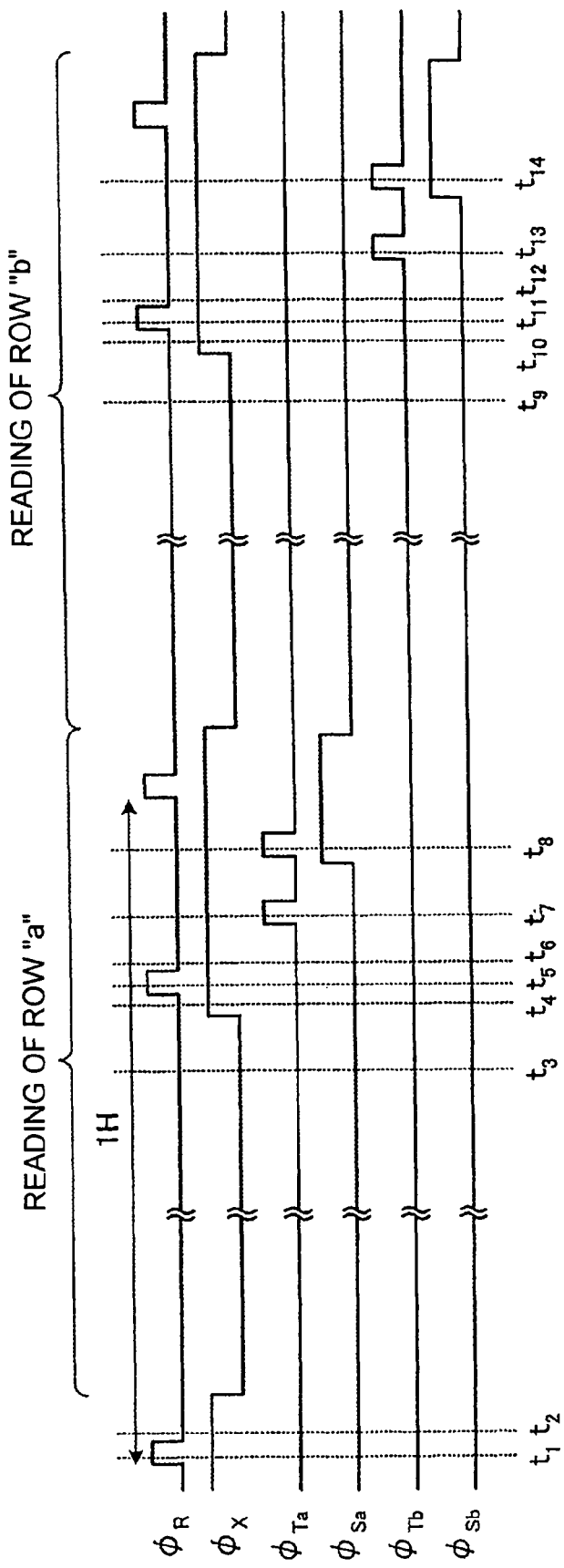
FIG. 24 is a drive timing diagram of the solid-state imaging device according to the fifth embodiment of the present invention.

Here, description is made of an operating method for the solid-state imaging device according to this embodiment shown in FIGS. 22 and 23. FIG. 24 is a drive timing diagram for the solid-state imaging device according to this embodiment. In each pixel block, when the pixels "a" and "b" are to be read, the reading is performed by using the same floating region FD, amplification transistor SF, reset transistor R, and selection transistor X.

First, prior to exposure storage, the storage transistor Sa of the pixel "a" is set to on, and the transfer transistor Ta and reset transistor R are set to off. At this time, the photodiode PDa of the pixel "a" is in a completely depleted state. Next, the reset transistor R is switched on, to reset the floating region FD and storage capacitor CSa of the pixel "a" (time: $t_1$). Then, reset noises of (FD+CSa) captured immediately after the reset transistor R has been switched off, are read as noise signals N2 (time: $t_2$). Here, the noise signals N2 include variations in the threshold voltage of the amplification transistor SF, as a fixed pattern noise component. During storage period (time: $t_3$), photocharges before saturation are stored by the photodiode PDa, and excess photocharges when the saturation is exceeded, are stored in the storage capacitor CSa via the overflow gate LOa. This operation allows charges overflowing the photodiode PD to be effectively used without being thrown away. In this manner, in both periods before and after saturation, storage operations are performed by receiving light by the same photodiode PD for each pixel in the same storage period.

After the storage has completed (time: $t_4$), the selection transistor X is switched on. Then, the reset transistor R is switched on, to reset the floating region FD (t: $t_5$), and FD reset noises captured immediately after the reset are read as noise signals N1 (time: $t_6$). Here, the noise signals N1 include variations in the threshold voltage of the amplification transistor SF, as a fixed pattern noise component. Next, the transfer transistor Ta is switched on, to completely transfer optical signals stored in the photodiode PDa to the floating region FD (time: $t_7$), and the signals are read as (S1+N1). Then, the storage transistor Sa is also switched on (time: $t_8$), to completely transfer photocharges stored in the photodiode PDa to the floating region FD and storage capacitor CSa; the charges in the photodiode PDa, floating region FD, and storage capacitor CSa are mixed; and the signals are read as (S1+S2+N1). In the pixel "b" also, prior to exposure storage, the storage transistor Sb is set to on, and the transfer transistor Tb and reset transistor R are set to off. Next, the reset transistor R is switched on, to reset the floating region FD and storage capacitor CSb, and the reset noises of (FD+CSb) captured immediately after the reset transistor R has been switched off, are read as noise signals N2. Here, the noise signals N2 include variations in the threshold voltage of the amplification transistor SF, as a fixed pattern noise component.

During storage period (time: $t_9$), photocharges before saturation are stored by the photodiode PDb, and excess photocharges when the saturation is exceeded, are stored in the storage capacitor CSb via the overflow gate LOb.

After the storage has been completed (time: $t_{10}$), the selection transistor X is switched on. Then, the reset transistor R is switched on, to reset the floating region FD (t: $t_{11}$), and FD reset noises captured immediately after the reset are read as noise signals N1 (time: $t_{12}$).

Next, the transfer transistor Tb is switched on, to completely transfer optical signals stored in the photodiode PDb to the floating region FD (time: $t_{13}$), and the signals are read as (S1+N1). Then, the storage transistor Sb is also switched on (time: $t_{14}$), to completely transfer photocharges stored in the photodiode PDb to the floating region FD and storage capacitor CSb. The charges stored in the photodiode PDb, floating region FD, and storage capacitor CSb are mixed, and signals are read as (S1+S2+N2).

In the solid-state imaging device according to this embodiment, because the floating region FD, amplification transistor SF, reset transistor R, and selection transistor X are provided at a rate of one group per two pixels, the pixel area per pixel can be reduced.

The block diagram of the solid-state imaging device according to this embodiment is the same as FIG. 10 shown in the first embodiment except that output lines are provided at a rate of one per two pixels. Signals point-sequentially read from each pixel, the enlargement ratio of dynamic range, and the synthesis of a wide dynamic range signal in the embodiment are the same as those described in the first embodiment.

In the above-described operations, the description was made of the case where pixels provided at pixel blocks are sequentially driven and signals obtained from all pixels were used. However, as a thinning-out operation, one may select any pixels from the pixel blocks to use signals obtained from the selected pixels. Alternatively, as an averaging operation, one may mix and add pixel signals in the pixel blocks to thereby use the signals.

As in the case of the first embodiment, the solid-state imaging device according to this embodiment increases the sensitivity on the high-illuminance side without reducing the sensitivity on the low-illuminance side to achieve a wide range, and in addition, it does not use a power supply voltage exceeding the commonly-used range. This allows the present solid-state imaging device to address the miniaturization of image sensor in the future. Moreover, because the addition of elements is reduced to a minimum, there is no possibility of incurring an increased pixel size.

Furthermore, unlike the conventional image sensor implementing a wide dynamic range, the present embodiment stores photocharges in the same storage period without dividing the storage period between the high-illuminance side and low-illuminance side, namely, without straddling frames. This prevents the deterioration of image quality even in the imaging of moving images.

Moreover, regarding leak currents from the floating region FD, in the image sensor according to this embodiment, minimum signals of (S1+S2) becomes saturated charges from the photodiode PD, so that the image sensor comes to treat a charge amount larger than that of the leak currents from the floating region FD. This offers an advantage of making the image sensor impervious to the FD leakage.

Sixth Embodiment

Figure 25:
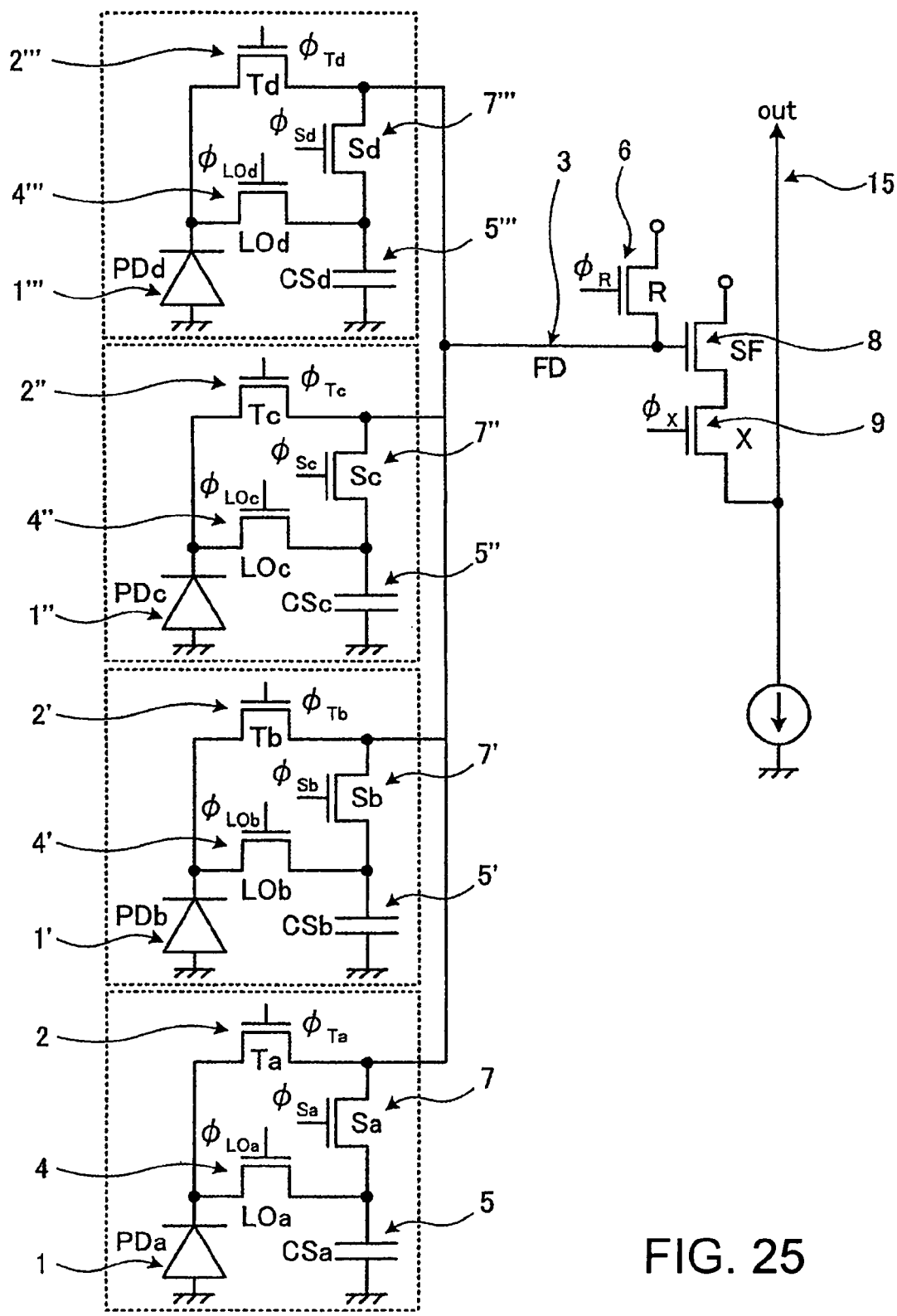
FIG. 25 is an equivalent circuit diagram of four pixels in a solid-state imaging device according to a sixth embodiment of the present invention.
Figure 26:
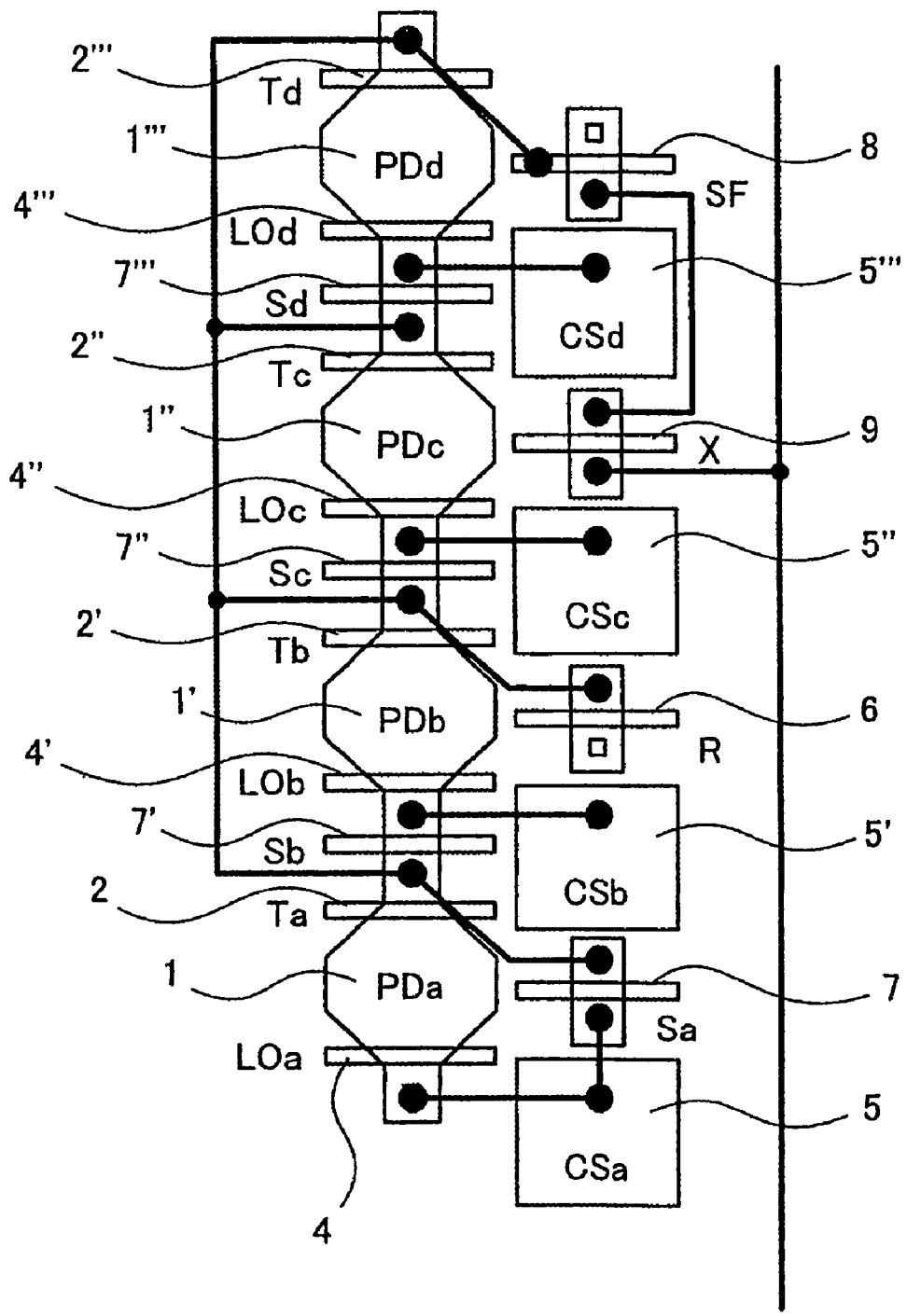
FIG. 26 is a schematic plan view of the four pixels in the solid-state imaging device according to the sixth embodiment of the present invention.

The solid-state imaging device according to this embodiment is one in which the circuit configuration in the solid-state imaging device according to the first embodiment is modified. FIG. 25 is an equivalent circuit diagram of four pixels in a solid-state imaging device according to the present embodiment, and FIG. 26 is a schematic plan view thereof.

The solid-state imaging device according to this embodiment is one having a pixel block composed of four pixels "a", "b", "c", and "d" as a basic unit, each pixel block including four diodes and four storage capacitors. Each pixel block comprises: photodiodes PDa1, PDb1', PDc1", and PDd1'" that receive light and that produce and store photocharges; transfer transistors Ta2, Tb2', Tc2", and Td2'" that are provided adjacently to the photodiodes PDa1, PDb1', PDc1", and PDd1'", respectively, and that transfer the photocharges; one floating region FD3 connected to the photodiodes PDa1, PDb1', PDc1", and PDd1'" via the transfer transistors Ta2, Tb2', Tc2", and Td2''', respectively; overflow gate LOa4, LOb4', LOc4", and LOd4''' that are provided adjacently to the photodiodes PDa1, PDb1', PDc1", and PDd1''', respectively, for transferring photocharges overflowing the respective photodiodes PDa1, PDb1', PDc1", and PDd1''' during a storage operation; storage capacitors CSa5, CSb5', CSc5", and CSd5''' that store photocharges overflowing the photodiodes PDa1, PDb1', PDc1", and PDd1''', respectively, through the respective overflow gates LOa4, LOb4', LOc4", and LOd4''' during the storage operation; a reset transistor R6 connected to each of the storage capacitors CSa5, CSb5', CSc5", and CSd5''', for discharging signal charges in the storage capacitors CSa5, CSb5', CSc5", and CSd5''' and floating region FD3; storage transistors Sa7, Sb7', Sc7", and Sd7''' provided between the floating region FD3 and the storage capacitors CSa5, CSb4' CSc5", and CSd5'''; an amplification transistor SF8 for reading signal charges of the floating region FD3, or each of signal charges of the floating region FD3 and the storage capacitor CSa5 and CSb5', CSc5", and CSd5''', as a voltage; and a selection transistor X9 connected to the amplification transistor SF8, for selecting the pixel or the pixel block. In this manner, the pixel block as a basic unit is configured to include four photodiodes, four storage capacitors, a floating region FD, an amplification transistor SF, a reset transistor r, and a selection transistor X.

In the solid-state imaging device according to this embodiment, a plurality of the pixels with the above-described arrangement is stored in two-dimensional or one-dimensional array. In each pixel block, drive lines $\phi_{LOa}$, $\phi_{LOb}$, $\phi_{LOc}$, $\phi_{LOd}$, $\phi_{Ta}$, $\phi_{Tb}$, $\phi_{Tc}$, $\phi_{Td}$, $\phi_{Sa}$, $\phi_{Sb}$, $\phi_{Sc}$, $\phi_{Sd}$, and $\phi_R$, respectively, are connected to gate electrodes of the overflow gates LOa4, LOb4', LOc4", and LOd4''', transfer transistors Ta2, Tb2', Tc2", and Td2''', storage transistors Sa7, Sb7', Sc7", and Sd7''', and reset transistor R6. Also, a pixel selection line $\phi_X$ driven by a row shift register is connected to a gate electrode of the selection transistor X9. Furthermore, an output line OUT15 is connected to the output side source of the selection transistor X9, and controlled by a column shift register to produce an output.

As in the case of the above-described first embodiment, the construction of the solid-state imaging device according to this embodiment is not limited, as long as the voltage of the floating region FD3 can be fixed to an appropriate value so as to be able to perform a selection operation or non-selection operation of a pixel. Therefore, the selection transistor X9 and drive line $\phi_X$ may also be omitted.

In the solid-state imaging device according to the present embodiment, its schematic sectional view representing the regions of the photodiodes PDa1, PDb1', PDc1", and PDd1''', overflow gates LOa4, LOb4', LOc4" and LOd4''', and storage capacitors CSa5, CSb5', CSc5", and CSd5''' in the pixels "a" and "b" of a pixel block is similar to FIG. 8A shown in the first embodiment, and hence it is omitted from depiction to avoid redundancy. Furthermore, the schematic sectional view of the present solid-state imaging device, corresponding to the regions of photodiodes PDa1, PDb1', PDc1", and PDd1''', transfer transistors Ta2, Tb2', Tc2", Td2''', floating region FD3, storage transistors Sa7, Sb7', Sc7", and Sd7''', and storage capacitors CSa5 and CSb5', CSc5", and CSd5''' in the pixel is similar to FIG. 8B shown in the first embodiment, and hence it is omitted from depiction, as well.

Figure 27:
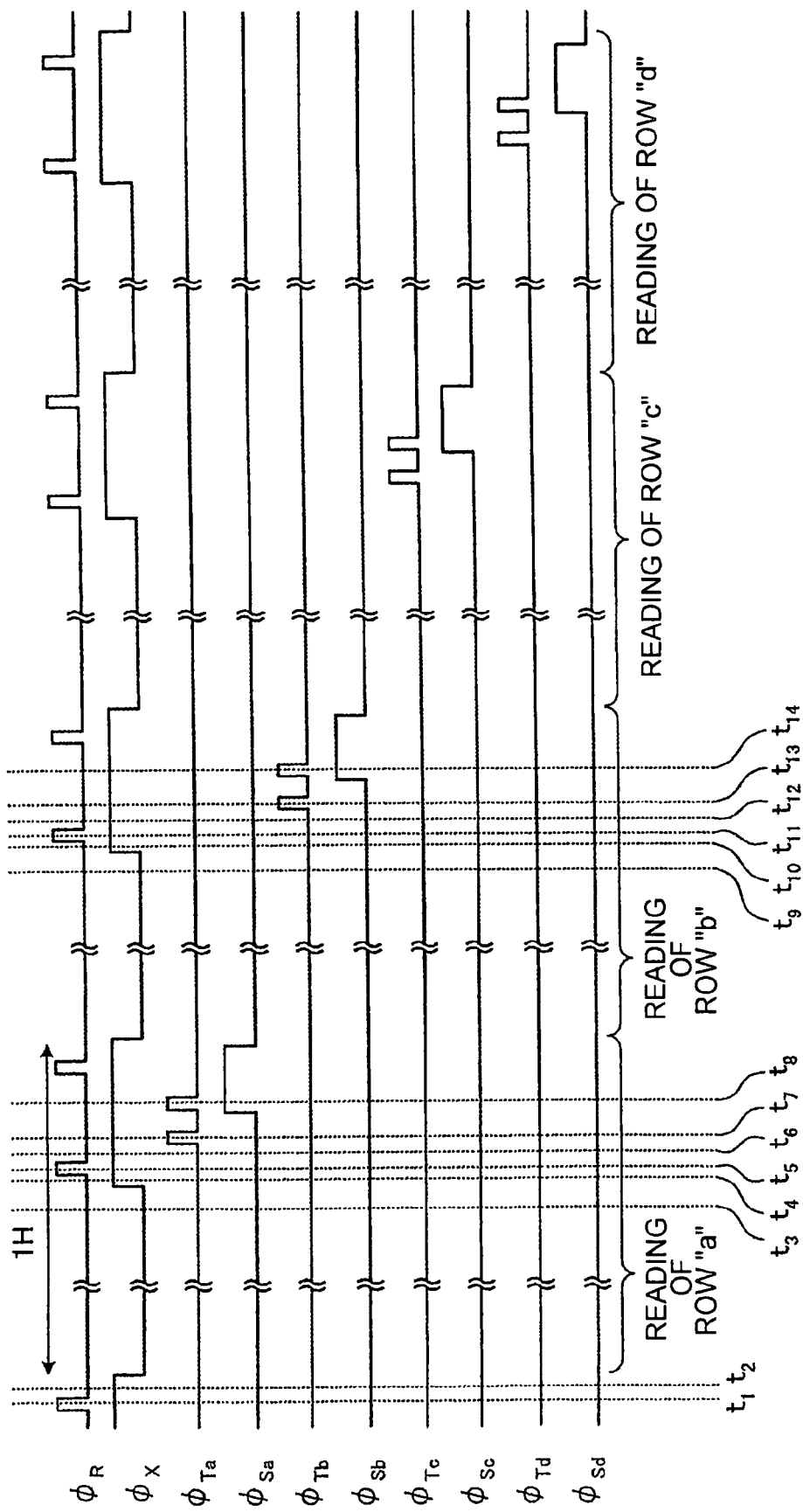
FIG. 27 is a drive timing diagram of the solid-state imaging device according to the sixth embodiment of the present invention.

Here, description is made of an operating method for the solid-state imaging device according to this embodiment shown in FIGS. 25 and 26. FIG. 27 is a drive timing diagram for the solid-state imaging device according to this embodiment. In each pixel block, when the pixels "a", "b", "c", and "d" are to be read, the reading is performed by using the same floating region FD, amplification transistor SF, reset transistor R, and selection transistor X.

First, prior to exposure storage, the storage transistor Sa of the pixel "a" is set to on, and the transfer transistor Ta and reset transistor R are set to off. At this time, the photodiode PDa of the pixel "a" is in a completely depleted state.

Next, the reset transistor R is switched on, to reset the floating region FD and storage capacitor CSa of the pixel "a" (time: $t_1$). Then, reset noises of (FD+CSa) captured immediately after the reset transistor R has been switched off, are read as noise signals N2 (time: $t_2$). Here, the noise signals N2 include variations in the threshold voltage of the amplification transistor SF, as a fixed pattern noise component.

During storage period (time: $t_3$), photocharges before saturation are stored by the photodiode PDa, and excess photocharges when the saturation is exceeded, are stored in the storage capacitor CSa via the overflow gate LOa. This operation allows charges overflowing the photodiode PD to be effectively used without being thrown away. In this manner, in both periods before and after saturation, storage operations are performed by receiving light by the same photodiode PD for each pixel in the same storage period.

After the storage has completed (time: $t_4$), the selection transistor X is switched on. Then, the reset transistor R is switched on, to reset the floating region FD (t: $t_5$), and FD reset noises captured immediately after the reset are read as noise signals N1 (time: $t_6$). Here, the noise signals N1 include variations in the threshold voltage of the amplification transistor SF, as a fixed pattern noise component.

Next, the transfer transistor Ta is switched on, to completely transfer optical signals stored in the photodiode PDa to the floating region FD (time: $t_7$), and the signals are read as (S1+N1). Then, the storage transistor Sa is also switched on (time: $t_8$), to completely transfer photocharges stored in the photodiode PDa to the floating region FD and storage capacitor CSa; the charges in the photodiode PDa, floating region FD, and storage capacitor CSa are mixed; and the signals are read as (S1+S2+N2). In the pixel "b" also, prior to exposure storage, the storage transistor Sb is set to on, and the transfer transistor Tb and reset transistor R are set to off. Next, the reset transistor R is switched on, to reset the floating region FD and storage capacitor CSb, and the reset noises of (FD+CSb) captured immediately after the reset transistor R has been switched off, are read as noise signals N2. Here, the noise signals N2 include variations in the threshold voltage of the amplification transistor SF, as a fixed pattern noise component.

During storage period (time: $t_9$), photocharges before saturation are stored in the photodiode PDb, and excess photocharges when the saturation is exceeded, are stored in the storage capacitor CSb via the overflow gate LOb. After the storage has been completed (time: $t_{10}$), the selection transistor X is switched on. Then, the reset transistor R is switched on, to reset the floating region FD (t: $t_{11}$), and FD reset noises captured immediately after the reset are read as noise signals N1 (time: $t_{12}$). Next, the transfer transistor Tb is switched on, to completely transfer optical signals stored in the photodiode PDb to the floating region FD (time: $t_{13}$), and the signals are read as (S1+N1). Then, the storage transistor Sb is also switched on (time: $t_{14}$), to completely transfer the photocharges stored in the photodiode PDb to the floating region FD and storage capacitor CSb. The charges stored in the photodiode PDb, floating region FD, and storage capacitor CSb are mixed, and the signals are read as (S1+S2+N2). Hereinafter, with respect to the pixels "c" and "d", the same operations are repeated.

In the solid-state imaging device according to this embodiment, because the floating region FD, amplification transistor SF, reset transistor R, and selection transistor X are provided at a rate of one group per four pixels, the pixel area per pixel can be reduced.

In the above-described operations, the description was made of the case where pixels provided at pixel blocks are sequentially driven and signals obtained from all pixels were used. However, as a thinning-out operation, one may select any pixels from the pixel blocks to use signals obtained from the selected pixels. Alternatively, as an averaging operation, one may mix and add pixel signals in the pixel blocks to use the signals.

The block diagram of the solid-state imaging device according to this embodiment is the same as FIG. 10 shown in the first embodiment except that output lines are provided at a rate of one per four pixels. Signals point-sequentially read from each pixel, the enlargement ratio of dynamic range, and the synthesis of a wide dynamic range signal in the embodiment are the same as those described in the first embodiment.

As in the case of the first embodiment, the solid-state imaging device according to this embodiment increases the sensitivity on the high-illuminance side without reducing the sensitivity on the low-illuminance side to achieve a wide range, and in addition, it does not use a power supply voltage exceeding the commonly-used range. This allows the present solid-state imaging device to address the miniaturization of image sensor in the future. Moreover, because the addition of elements is reduced to a minimum, there is no possibility of incurring an increased pixel size.

Furthermore, unlike the conventional image sensor implementing a wide dynamic range, the present embodiment stores photocharges in the same storage period without dividing the storage period between the high-illuminance side and low-illuminance side, namely, without straddling frames. This prevents the deterioration of image quality even in the imaging of moving images.

Moreover, regarding leak currents from the floating region FD, in the image sensor according to this embodiment, minimum signals of (S1+S2) becomes saturated charges from the photodiode PD, so that the image sensor comes to treat a charge amount larger than that of leak currents of the floating region FD. This offers an advantage of making the image sensor impervious to the FD leakage.

Seventh Embodiment

The solid-state imaging device according to this embodiment is an example in which a storage capacitor for storing photocharges overflowing the photodiode is modified in the above-described first to sixth embodiments.

When attempting to use a junction storage capacitor as the storage capacitor, a possible electrostatic capacitance per square μm is on the order of 0.3 to 3 fF/μm² even under consideration of conditions, that is, its area efficiency is not very high, and hence it is difficult to widen dynamic range.

On the other hand, in the case of a planar storage capacitor, when the insulating film electric field is set to 3 to 4 MV/cm or less, the maximum applied voltage is set to 2.5 to 3 V, and the capacitor insulating film thickness is set to the order of 7 nm in order to suppress insulating film leak current of the capacitor insulating film, the electrostatic capacitance becomes 4.8 fF/μm² for a relative dielectric constant $\epsilon_r$=3.9, the electrostatic capacitance becomes 9.9 fF/μm² for $\epsilon_r$=7.9, the electrostatic capacitance becomes 25 fF/μm² for $\epsilon_r$=20, and the electrostatic capacitance becomes 63 fF/μm² for $\epsilon_r$=50.

Use of a so-called high-k material, such as silicon nitride ($\epsilon_r$: 7.9), $Ta_2O_5$ ($\epsilon_r$: about 20 to 30), $HfO_2$ ($\epsilon_r$: about 30), $ZrO_2$ ($\epsilon_r$: about 30), and $La_2O_3$ ($\epsilon_r$: about 40 to 50), besides silicon oxide ($\epsilon_r$: 3.9), allows an larger electrostatic capacitance to be implemented, whereby even in the case of a planar storage capacitor having a relatively simple structure, an image sensor having a dynamic range as wide as 100 to 200 dB can be realized.

Moreover, application of a structure, such as a stack type or trench type, capable of enlarging an area where a capacitor contributes by suppressing an occupied area, allows a dynamic range as wide as 120 dB to be achieved, and further, using the above-described high-k materials in combination enables dynamic ranges as wide as 140 dB and 160 dB to be attained by the stack type and trench type, respectively.

Figure 28:
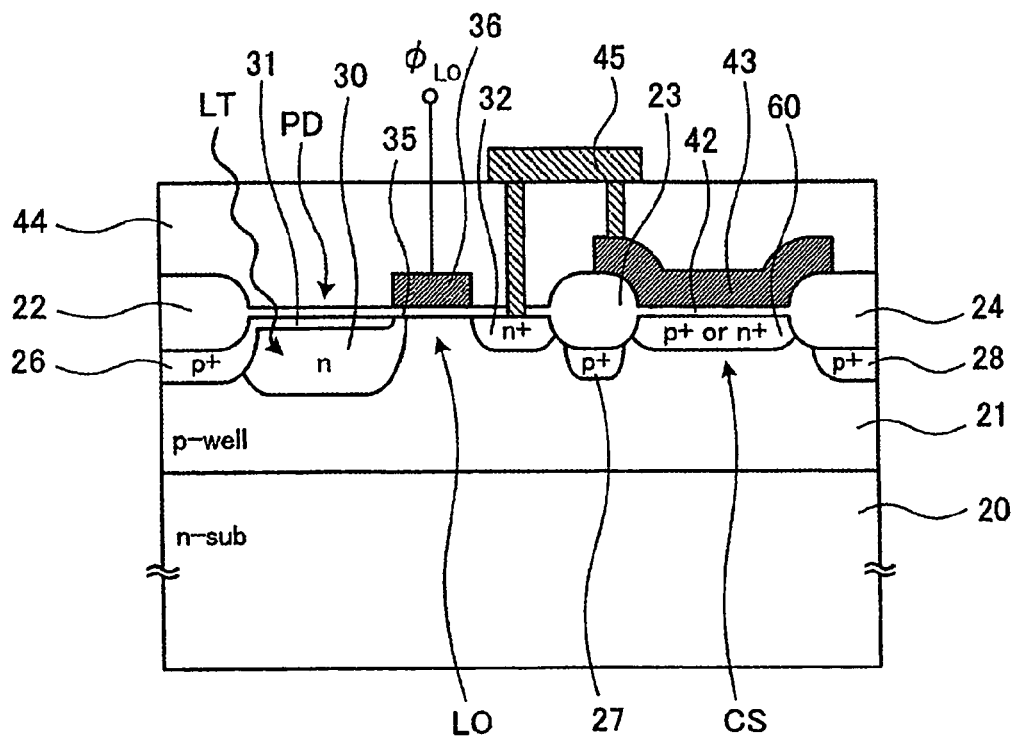
FIG. 28 is a sectional view of a pixel in a solid-state imaging device according to a seventh embodiment of the present invention.

Hereinafter, examples of storage capacitors to which the present embodiment is applicable are shown. FIG. 28 is a sectional view of a planar MOS storage capacitor similar to that in the first embodiment. This storage capacitor CS is, for example, configured so as to include an n+type semiconductor region 60 serving as a lower electrode, formed in the surface layer of a p type well formed on the substrate 20; a capacitor insulating film 42 made of silicon oxide, formed on the n+type semiconductor region 60; and an upper electrode 43 made of polysilicon or the like, formed on the capacitor insulating film 42.

Figure 29:
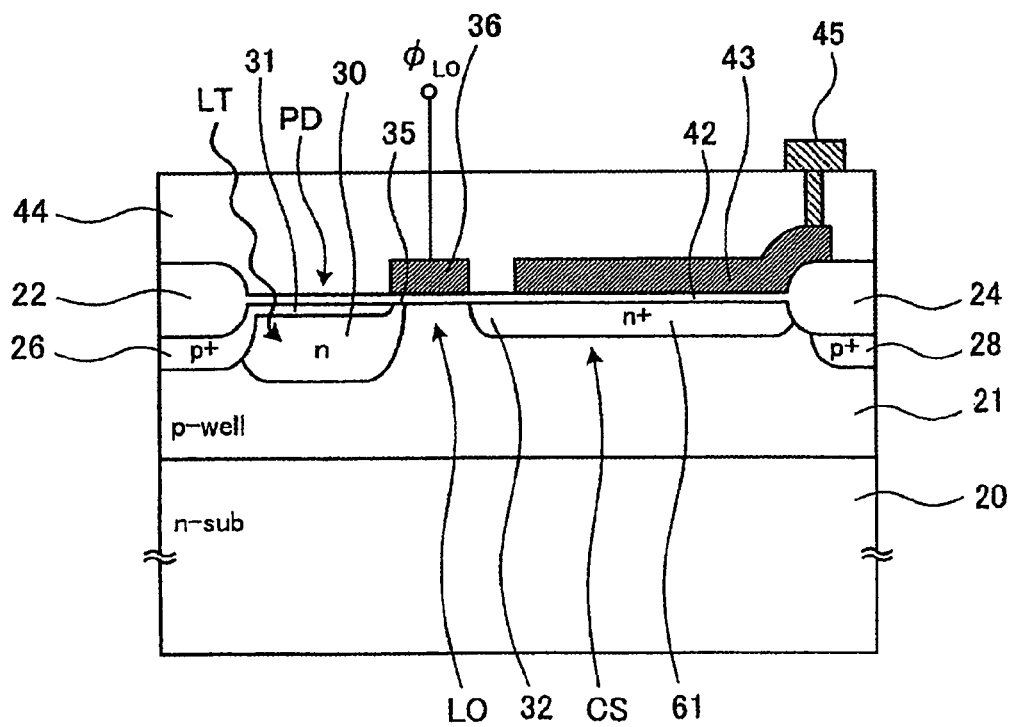
FIG. 29 is a sectional view of a pixel in the solid-state imaging device according to the seventh embodiment of the present invention.

FIG. 29 is a sectional view showing a planar MOS and junction storage capacitor. This storage capacitor CS is, for example, configured so that an n+type semiconductor region 61 serving as a lower electrode, formed in the surface layer of a p type well formed on the n type semiconductor substrate 20, is integrally formed with an n+type semiconductor region 32 serving as a source/drain of the storage transistor; and an upper electrode 43 is formed via the capacitor insulating film 42 made of silicon oxide, provided on the n+type semiconductor region 61. Here, the power supply voltage VDD or a group GND is applied to the upper electrode 43.

Figure 30:
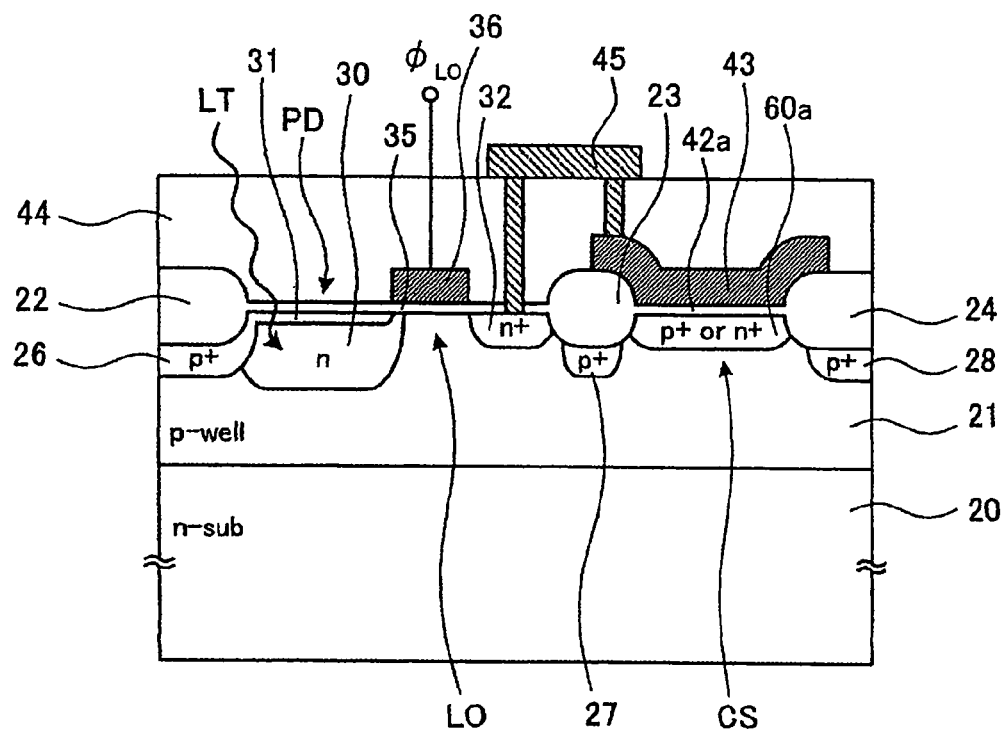
FIG. 30 is a sectional view of a pixel in the solid-state imaging device according to the seventh embodiment of the present invention.

The storage capacitor shown in FIG. 30 (sectional view) is a planar MOS storage capacitor similar to that shown in FIG. 28. However, in this storage capacitor, the capacitor insulating film 42a is constituted of a high-k material, such as silicon nitride or $Ta_2O_5$, unlike that in FIG. 28, and the capacitance is made larger than that in FIG. 28.

Figure 31:
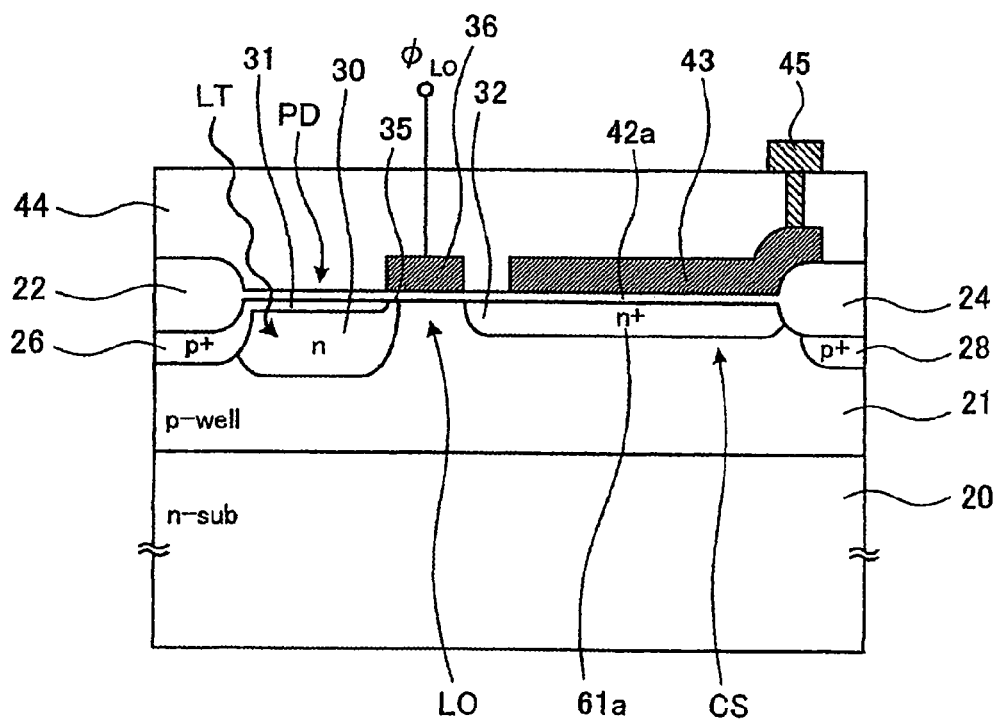
FIG. 31 is a sectional view of a pixel in the solid-state imaging device according to the seventh embodiment of the present invention.

The storage capacitor shown in FIG. 31 (sectional view) is a planar MOS and junction storage capacitor similar to that shown in FIG. 29. However, in this storage capacitor, the capacitor insulating film 42a is constituted of a high-k material, such as silicon nitride or $Ta_2O_5$, unlike that in FIG. 29, and the capacitance is made larger than that in FIG. 29.

Figure 32:
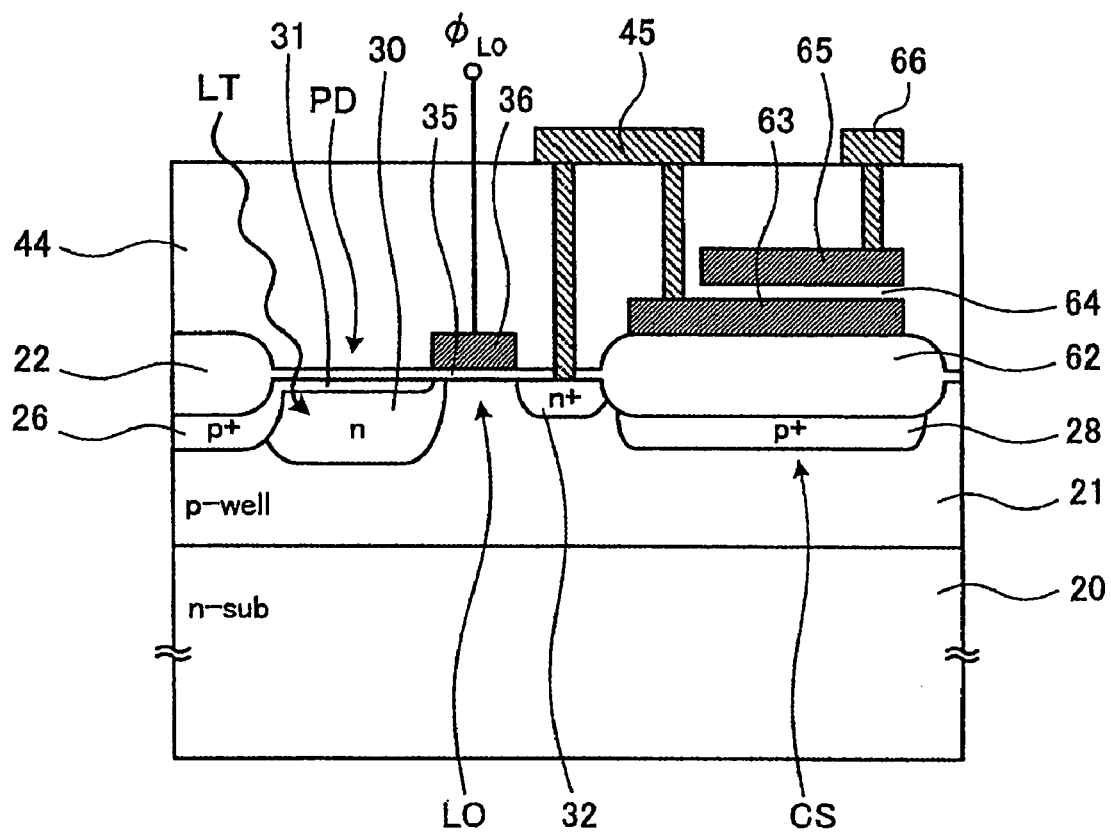
FIG. 32 is a sectional view of a pixel in the solid-state imaging device according to the seventh embodiment of the present invention.

FIG. 32 is a sectional view showing a stack storage capacitor. This storage capacitor CS is, for example, configured to include a lower electrode 63 formed on an element separation insulating film 62 provided above the n type semiconductor substrate 20; a capacitor insulating film 64 formed on the lower electrode 63; and an upper electrode 65 formed on the capacitor insulating film 64. Here, the n+type semiconductor region 32 serving as a source/drain of the storage transistor, and the lower electrode 63 are connected by the wiring 45. In this case, the power supply voltage VDD or the ground GND is applied to the upper electrode 65.

Figure 33:
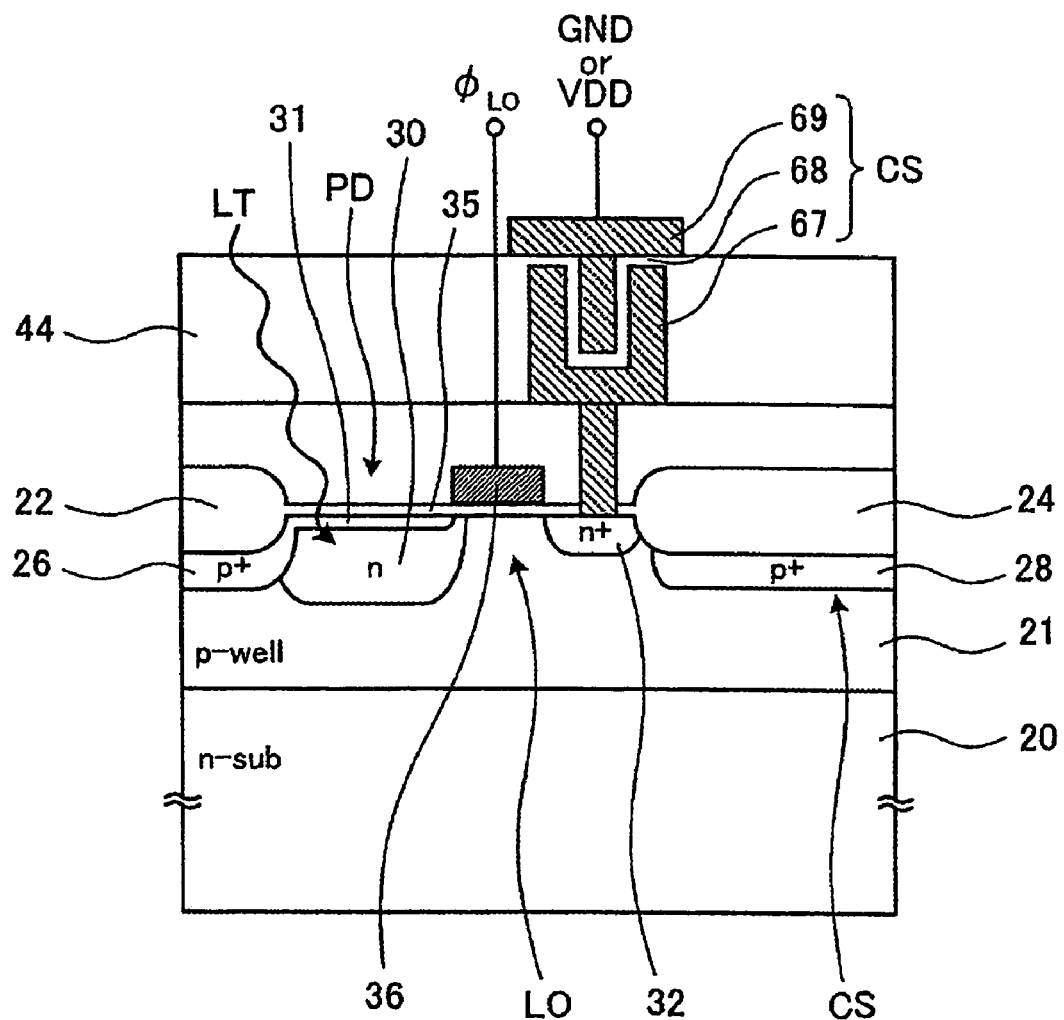
FIG. 33 is a sectional view of a pixel in the solid-state imaging device according to the seventh embodiment of the present invention.

FIG. 33 is a sectional view showing a stack storage capacitor. This storage capacitor CS is, for example, configured to include a lower electrode 67 formed so as to connect with the n+type semiconductor region 32 serving as a source/drain of the storage transistor; a capacitor insulating film 68 formed on the inner wall of the lower electrode 67; and an upper electrode 69 formed via the capacitor insulating film 68 so as to embed the inner portion of the lower electrode 67. Here, the power supply voltage VDD or the ground GND is applied to the upper electrode 69. The structure of the upper electrode 69 formed so as to embed the lower electrode 67 and the inner portion of the lower electrode 67, can be larger in a facing area, contributing to electrostatic capacitance than the common stack type.

Figure 34:
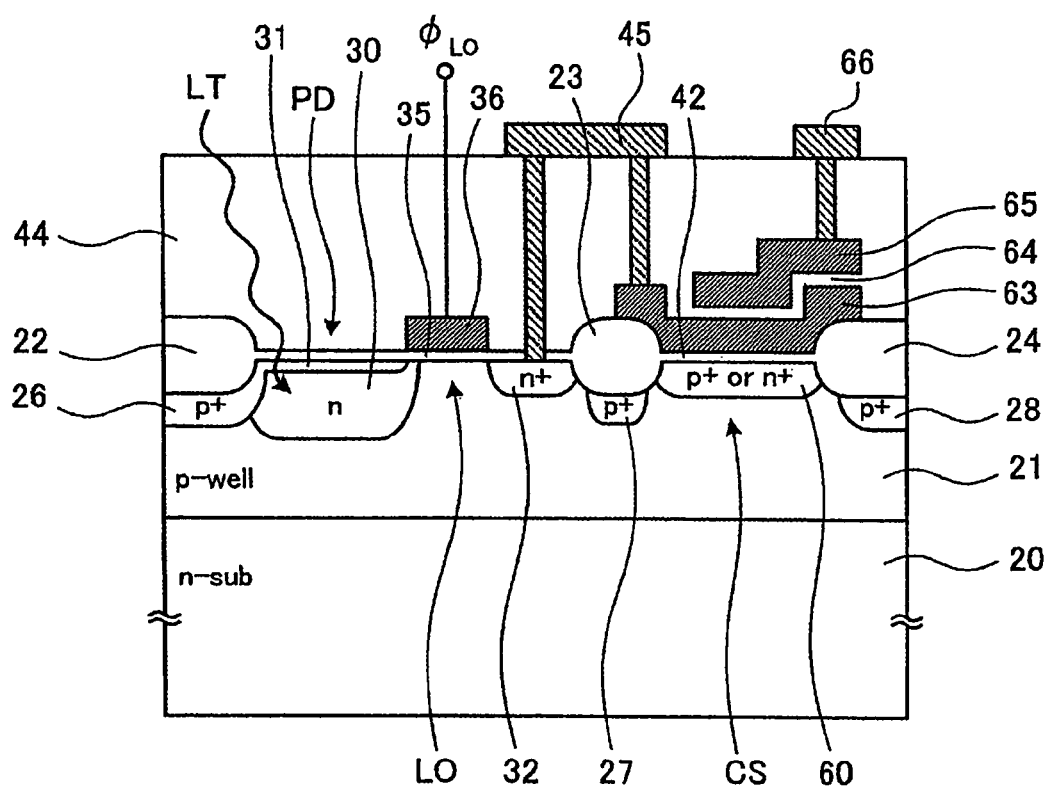
FIG. 34 is a sectional view of a pixel in the solid-state imaging device according to the seventh embodiment of the present invention.

FIG. 34 is a sectional view showing a composite storage capacitor obtained by combining the planar type and stack type. According to this example, a large capacitance with high area efficiency can be formed.

Figure 35:
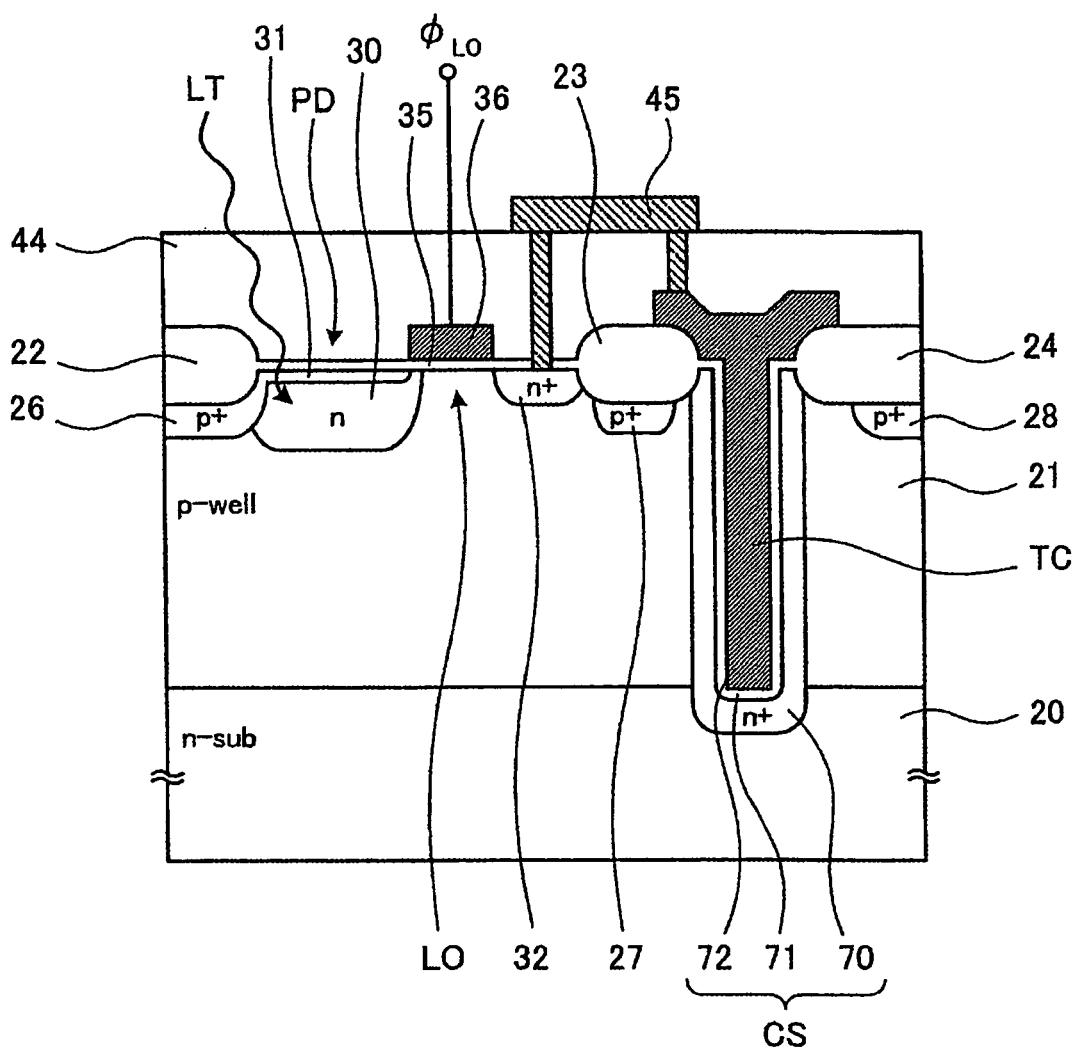
FIG. 35 is a sectional view of a pixel in the solid-state imaging device according to the seventh embodiment of the present invention.

FIG. 35 is a sectional view showing a trench storage capacitor. This storage capacitor CS is configured to include a trench TC formed so as to cut through the p type well 21 on the n–type semiconductor substrate 20 to reach the n type semiconductor substrate 20; an n+type semiconductor region 70 serving as a lower electrode, formed on the inner wall of the trench TC; a capacitor insulating film 71 formed so as to coat the inner wall of the TC; and an upper electrode 72 formed so as to embed the trench TC via the capacitor insulating film 71. Here, the n+type semiconductor region 32 serving as a source/drain of the storage transistor, and the upper electrode 72 are connected by the wiring 45.

Figure 36:
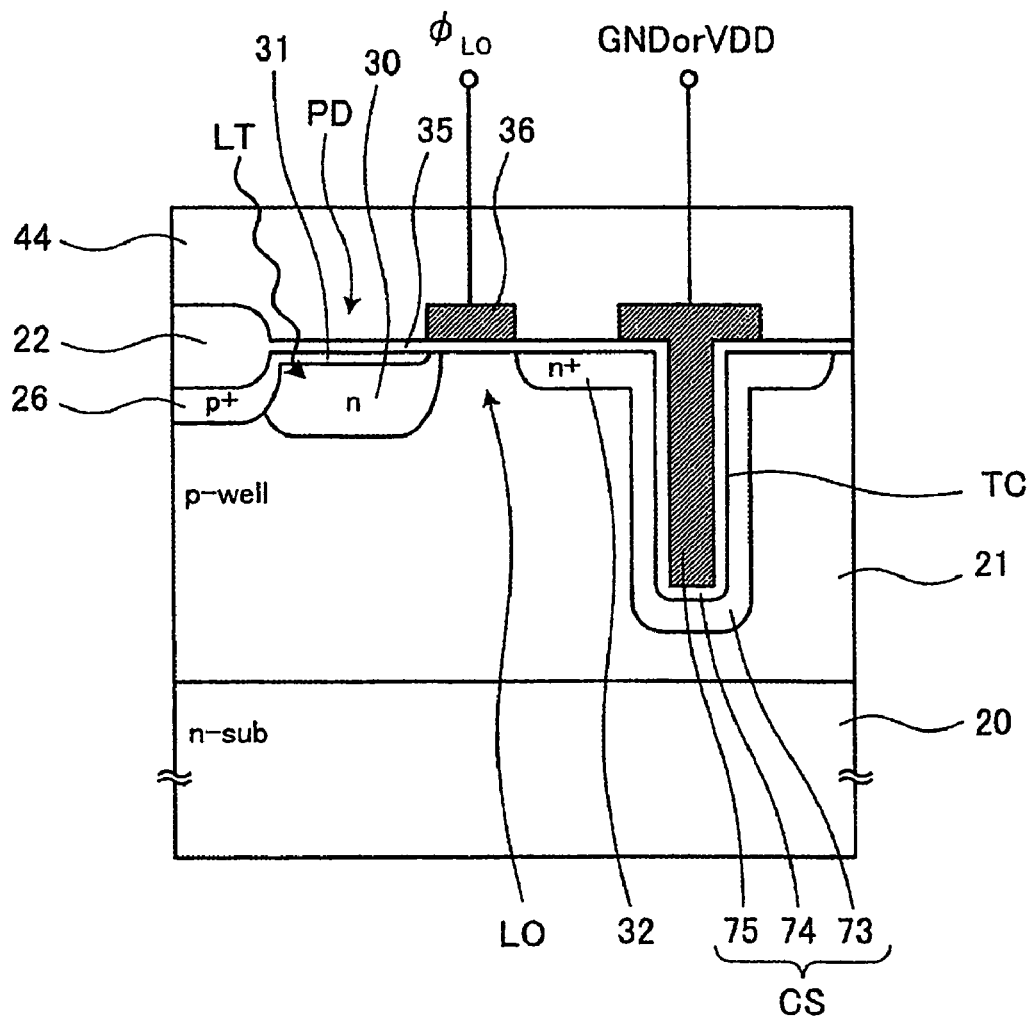
FIG. 36 is a sectional view of a pixel in the solid-state imaging device according to the seventh embodiment of the present invention.

FIG. 36 is a sectional view showing a trench storage capacitor having a junction. This storage capacitor CS is configured so that a trench TC is formed within the p type well 21 on the n type semiconductor substrate 20; in the inner wall of the trench TC, an n+type semiconductor region 73 serving as a lower electrode is integrally formed with an n+type semiconductor region 32 serving as a source/drain of the storage transistor; a capacitor insulating film 74 is formed so as to coat the inner wall of the TC; and an upper electrode 75 formed so as to embed the trench TC via the capacitor insulating film 74.

Figure 37:
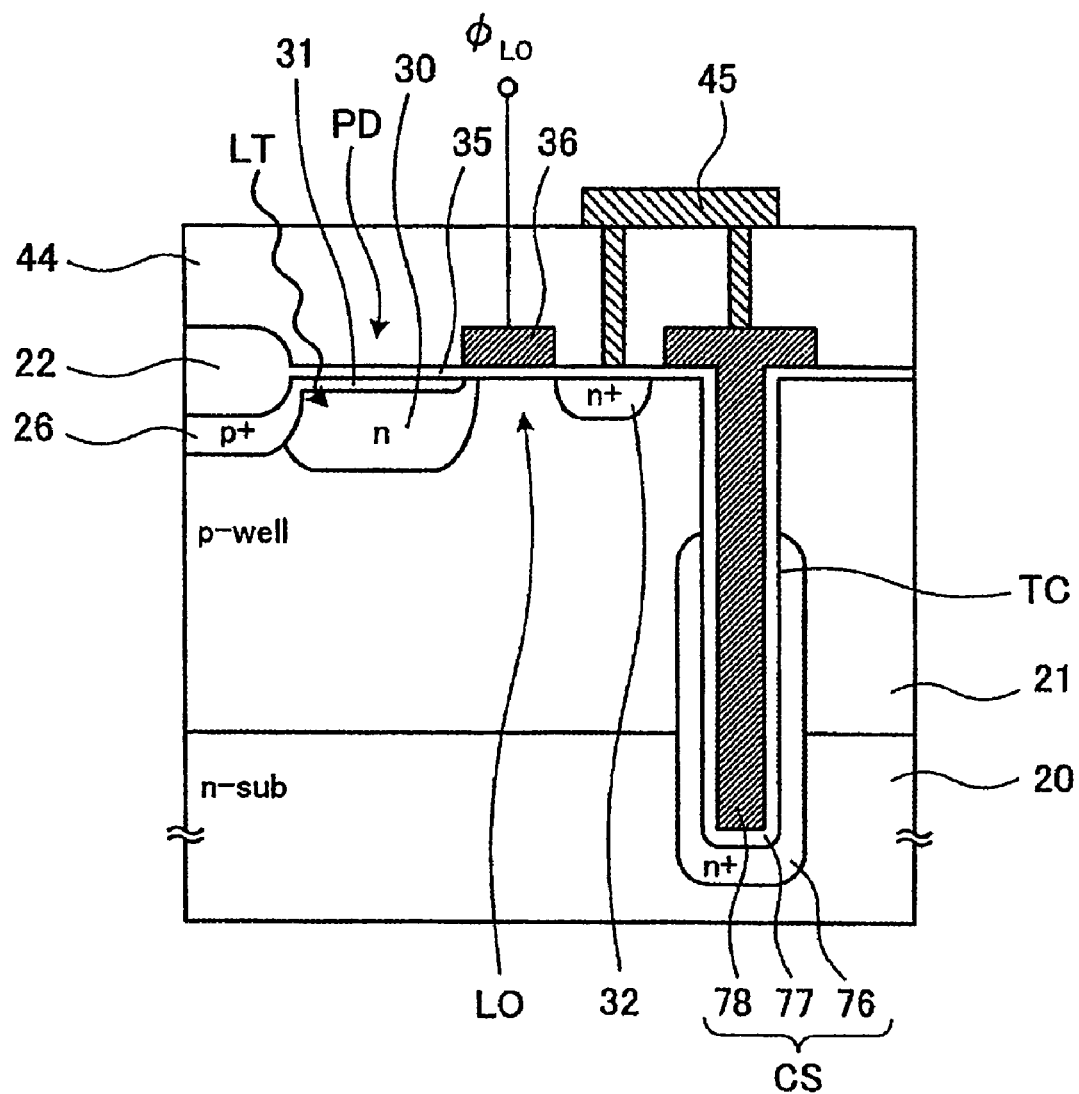
FIG. 37 is a sectional view of a pixel in the solid-state imaging device according to the seventh embodiment of the present invention.

FIG. 37 is a sectional view showing a trench storage capacitor. This storage capacitor CS is configured to include a trench TC formed so as to cut through the p type well 21 on the n–type semiconductor substrate 20 to reach the n type semiconductor substrate 20; an n+type semiconductor region 76 serving as a lower electrode, formed on the inner wall of the trench TC in a region deeper than a measure of depth of the trench TC; a capacitor insulating film 77 formed so as to coat the inner wall of the TC; and an upper electrode 78 formed so as to embed the trench TC via the capacitor insulating film 77. Here, the n+type semiconductor region 32 serving as a source/drain of the storage transistor, and the upper electrode 78 are connected by the wiring 45.

Figure 38:
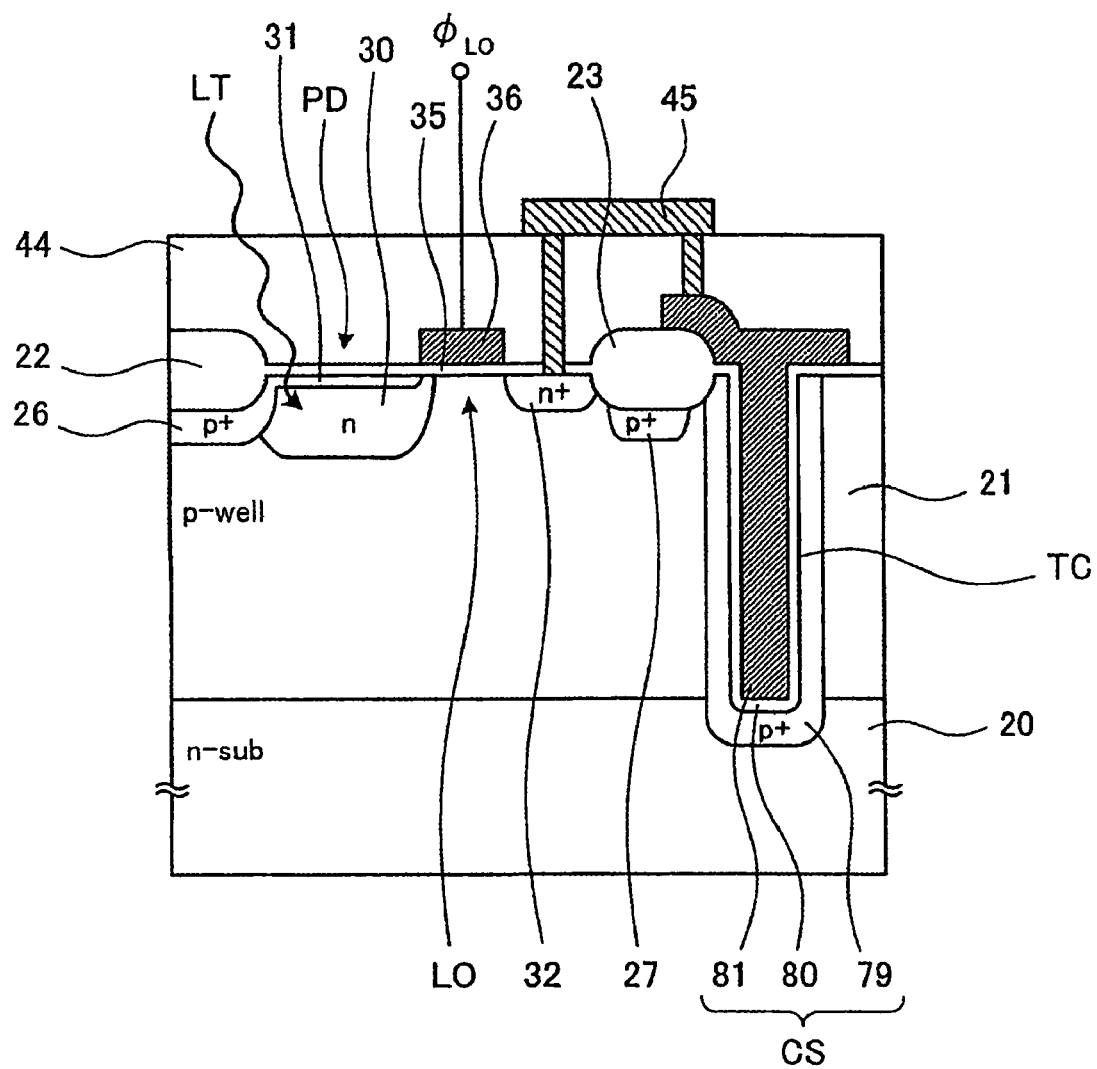
FIG. 38 is a sectional view of a pixel in the solid-state imaging device according to the seventh embodiment of the present invention.

FIG. 38 is a sectional view showing a trench storage capacitor. This storage capacitor CS is configured to include a trench TC formed so as to cut through the p type well 21 on the n–type semiconductor substrate 20 to reach the n type semiconductor substrate 20; an p+type semiconductor region 79 serving as a lower electrode, formed on the inner wall of the trench TC; a capacitor insulating film 80 formed so as to coat the inner wall of the TC; and an upper electrode 81 formed so as to embed the trench TC via the capacitor insulating film 80. Here, the n+type semiconductor region 32 serving as a source/drain of the storage transistor, and the upper electrode 81 are connected by the wiring 45.

Figure 39:
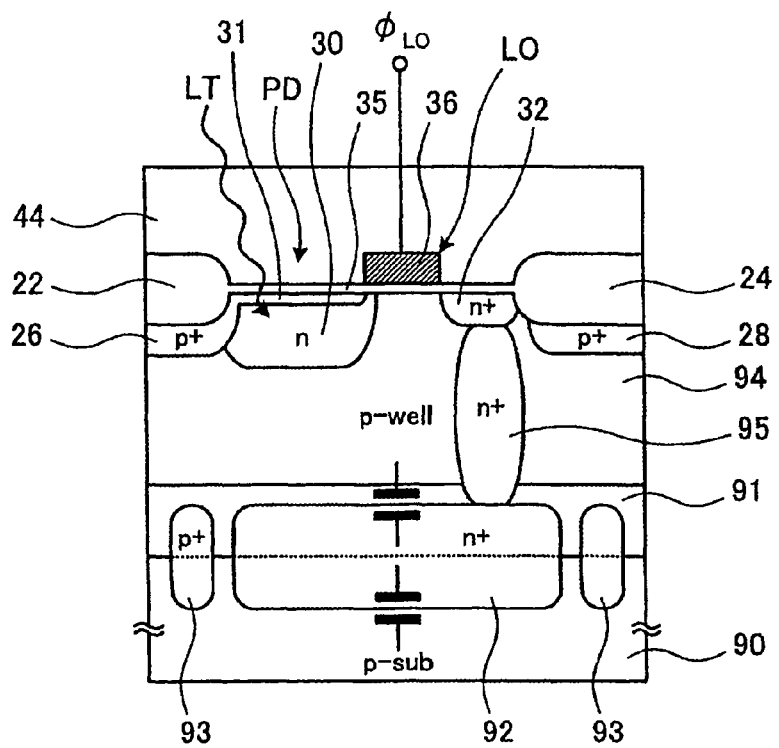
FIG. 39 is a sectional view of a pixel in the solid-state imaging device according to the seventh embodiment of the present invention.

FIG. 39 is a sectional view showing a CMOS sensor having an embedded storage capacitor using a junction capacitor. For example, a p type epitaxial layer 91 is formed on a p type silicon semiconductor (p-sub) 90, and an n+type semiconductor region 92 is formed across the p type silicon semiconductor 90 and p type epitaxial layer 91. That is, an n type (first conductive type) semiconductor region and a p type (second conductive type) semiconductor region joining therewith are embedded inside the semiconductor substrate constituting the solid-state imaging device, thus forming the embedded storage capacitor using a junction capacitor. Furthermore, p+type separation regions 93 are formed in the p type silicon semiconductor (p-sub) 90 and p type epitaxial layer 91. A p type silicon semiconductor layer 94 is formed on the p type epitaxial layer 91. As in the cases of the above-described embodiments, with respect to the p type silicon semiconductor layer 94, there are provided a photodiode PD, overflow gate LO, transfer transistor T, floating region FD, and storage transistor S. For example, the n+type semiconductor region 92 serving as a storage capacitor SC are widely formed over the forming regions, e.g., the above-described photodiode PD, overflow gate LO, transfer transistor T, floating region FD, and storage transistor S. Furthermore, the n+type semiconductor region 32 is connected with the n+type semiconductor region 92 constituting a storage capacitor by a n+type semiconductor region 95 vertically extending in the p type silicon semiconductor layer 94.

Figure 40:
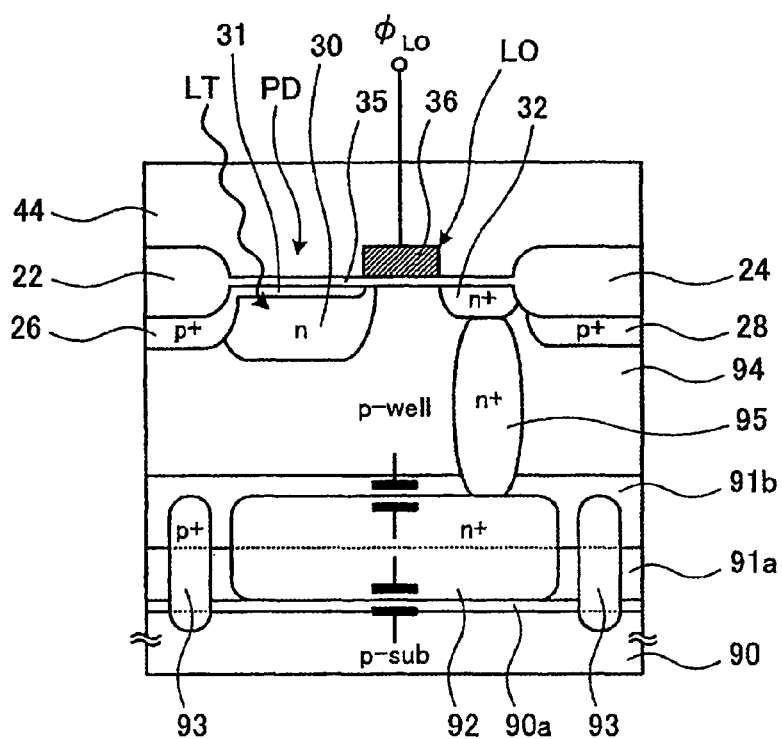
FIG. 40 is a sectional view of a pixel in the solid-state imaging device according to the seventh embodiment of the present invention.

FIG. 40 is a sectional view showing a CMOS sensor having an embedded storage capacitor using an insulating film capacitor and junction capacitor. This sensor has a structure similar to that in FIG. 39. However, in this sensor, a first p type epitaxial layer 91a and second p type epitaxial layer 91b are formed on the p type silicon semiconductor layer 90 (p-sub) via an insulating film 90a, thereby constituting an SOI (semiconductor on insulator) substrate such that a semiconductor layer is formed on the semiconductor substrate via an insulating film. Here, an n+type semiconductor region 92 is formed up to a region where it borders with an insulating film 90a, across the first p type epitaxial layer 91a and second p type epitaxial layer 91b, and a storage capacitor is formed using an insulating film capacitor between the semiconductor substrate and semiconductor layer that mutually oppose with the insulating film therebetween. Moreover, as in the case of the storage capacitor in FIG. 39, a junction capacitor is formed between the first p type epitaxial layer 91a and second p type epitaxial layer 91b. Other structure are the same as those in the CMOS sensor shown in FIG. 39.

Figure 41:
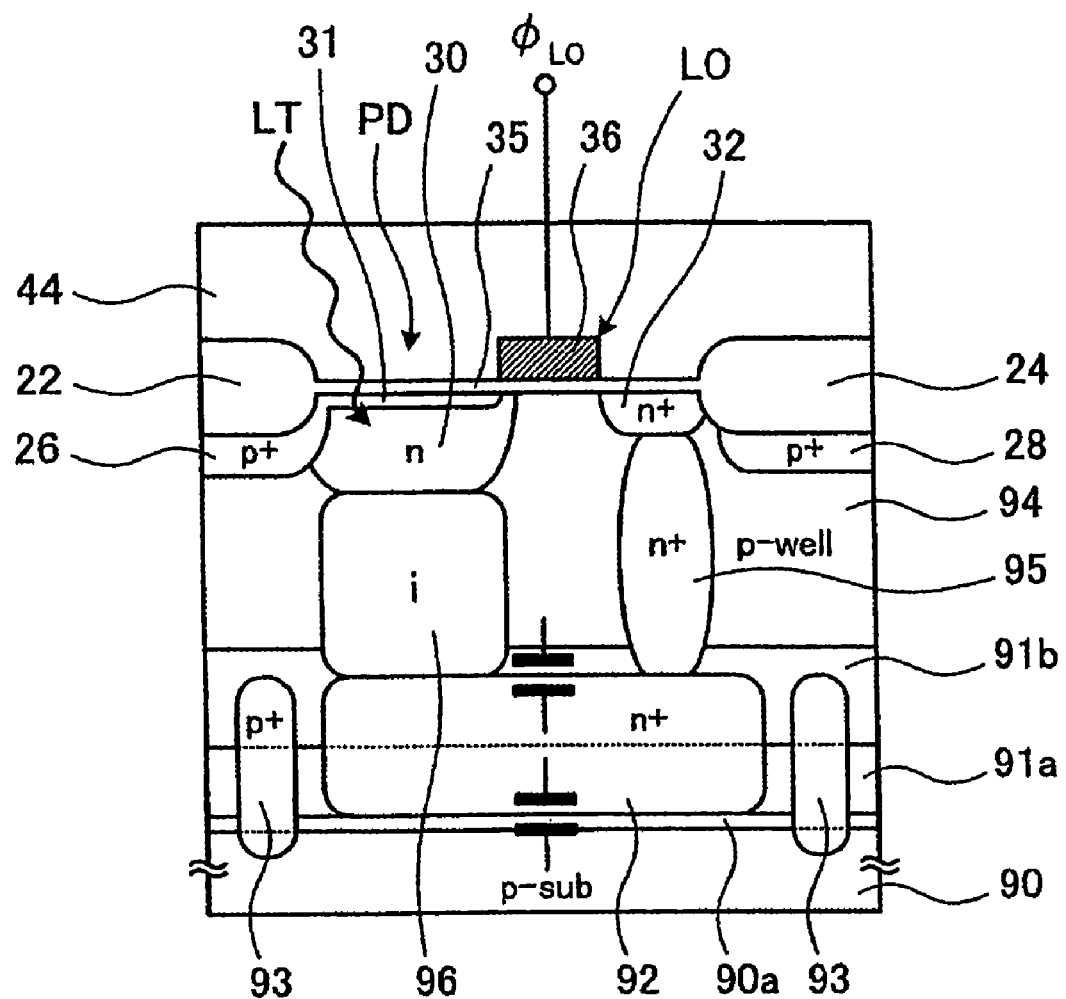
FIG. 41 is a sectional view of a pixel in the solid-state imaging device according to the seventh embodiment of the present invention.

FIG. 41 is a sectional view showing a CMOS sensor having an embedded storage capacitor using an insulating film capacitor and junction capacitor. This sensor has a structure similar to that in FIG. 40. However, in this sensor, a low-concentration semiconductor layer (i layer) 96 is formed between an n type semiconductor region 30 constituting the photodiode PD and an n+type semiconductor region 92 constituting a storage capacitor. This structure contributes to lowering a potential barrier between the n type semiconductor region 30 and the n+type semiconductor region 92, constituting an overflow path from the photodiode PD to the storage capacitor CS. This allows charges overflowing the photodiode PD to punch through to thereby smoothly move the charges to the storage capacitor CS during the storage of charges.

The foregoing diverse storage capacitors are applicable to any one of the above-described first to seventh embodiments. As described above, by storing photocharges overflowing the photodiode using any one of the storage capacitors with these shapes, the widening of dynamic range can be achieved on the high-illuminance side.

EXAMPLE 1

In the solid-state imaging device according to the present invention, a solid-state imaging device element were manufactured by a manufacturing method for a semiconductor having two layer polysilicon and three layer metal wiring.

Here, the solid-state imaging device element has pixels arranged in two-dimensional array with conditions: the number of pixels: 640 (row)×480 (column), 7.5 µm square in pixel size, floating region capacitance $C_{FD}$=4 fF, storage capacitance $C_{CS}$=60 fF. Each storage capacitor was constituted by parallel capacitors, i.e., polysilicon-silicon oxide film-silicon capacitor, and polysilicon-silicon nitride film-polysilicon capacitor. Saturation voltages for signals S1 and (S1+S2) were 500 mV and 1000 mV, respectively. Residual noise voltages, which remain in the S1 and (S1+S2) after noise removal, were of the same value of 0.09 mV. The switching voltage from S1 to (S1+S2) was set to 400 mV, which was lower than the saturation voltages for the signal S1.

The S/N ratio of the signal (S1+S2) to the residual noise at each switching point was higher than 40 dB, thereby allowing a solid-state imaging device having a high image quality to be implemented. A dynamic range of 100 dB was acquired. Moreover, during irradiation with high-illuminance light, excess photocharges overflowing the photodiode PD could be efficiently transferred to the storage capacitor by the overflow gate LO, so that leakage of the excess photocharges into adjacent pixels can be suppressed, resulting in enhanced blooming resistance and smearing resistance.

In this example 1, widening of dynamic range could be achieved on the high-illuminance side while maintaining a high S/N ratio.

EXAMPLE 2

In the solid-state imaging device according to the present invention, a solid-state imaging device were manufactured by arraying pixel blocks in two-dimensional array (number of pixels: 640 (row)×240 (column)). Here, each pixel block is constituted by arranging photodiodes and storage capacitors two by two on a basic pixel block with a size of 7 µm (length)× 3.5 µm (width). The effective pixel number was 640 (row)× 480 (column). In each pixel block, the floating region capacitance $C_{FD}$ was set to 3.4 fF, and the storage capacitance $C_{CS}$ was set to 100 fF by applying a trench storage capacitor structure. The saturation voltages for signals S1 and (S1+S2) were 500 mV and 1000 mV, respectively. The residual noise voltages, which remain in the S1 and (S1+S2) after noise removal, were of the same value of 0.09 mV. The switching voltage from S1 to (S1+S2) was set to 400 mV, which was lower than the saturation voltages for the signal S1.

The (S/N) ratio of the signal (S1+S2) to the residual noise at each switching point was higher than 40 dB, thereby allowing a solid-state imaging device having a high image quality to be implemented. A dynamic range of 110 dB was acquired. Moreover, during irradiation with high-illuminance light, excess photocharges overflowing the photodiode PD could be efficiently transferred to the storage capacitor by the overflow gate LO, so that leakage of the excess photocharges into adjacent pixels can be suppressed, resulting in enhanced blooming resistance and smearing resistance.

In this example 1, the widening of dynamic range could be achieved on the high-illuminance side while maintaining a high S/N ratio.

It is to be understood that the present invention is not limited to the above-described embodiments. For example, the present invention is not limited to its application to the solid-state imaging device in the embodiments; it may be applied to line sensors in which pixels in each solid-state imaging device are linearly arranged, or optical sensors that can be obtained by individually constituting pixels in each solid-state imaging device, whereby an unprecedentedly wide dynamic range and high S/N would be achievable.

Furthermore, the shape of storage capacitor, and the like are not particularly restricted. In order to increase capacitance with a memory storage capacitor of DRAM (dynamic random access memory) or the like, various methods that has hitherto been developed may be used. The construction of the solid-state imaging device according to the present invention is not restricted, as long as a photodiode and a storage capacitor for storing photocharges overflowing the photodiode are connected via an overflow gate. The solid-state imaging device according to the present invention is also applicable to CCD besides CMOS image sensors. Furthermore, various changes and modifications may of course be made in the present invention without departing from the spirit and scope thereof.

The solid-state imaging device according to the present invention can be applied to image sensors requiring a wide dynamic range, used for digital cameras, camera phones, monitor cameras, on-board camera, scanners, and so on.

The operating method for the solid-state imaging device according to the present invention can be applied to that for image sensors requiring a wide dynamic range.

What is claimed is:

1. A solid-state imaging device comprising a plurality of pixels,
    wherein each two or more pixels commonly comprises a floating region and each one of said plurality of pixels comprises:
    a photodiode receiving light and producing and storing photocharges;
    a transfer transistor that is coupled between said photodiode and said floating region and transfers photocharges stored in said photodiode to said floating region;
    a storage capacitor element;
    a storage transistor provided, separately from said transfer transistor, between said floating region and said storage capacitor element; and
    an overflow gate provided, separately from said transfer transistor and also separately from said storage transistor, between said photodiode and the connection of said storage capacitor element and said storage transistor, said overflow gate being directly coupled to said photodiode, and wherein said overflow gate is coupled to said storage capacitor element separately from said storage transfer transistor,
    and wherein in a storage period of said photodiode, said overflow gate transfers photocharges overflowed from said photodiode to said storage capacitor element, without passing through said floating region, and allows said storage capacitor element to store the overflowed photocharges,
    wherein:
    during a transfer period following a storage period of said photodiode, said transfer transistor is turned on to transfer charges stored in said photodiode to said floating region to allow said floating region to store the charges; and
    during a mixing period after said transfer period, said storage transistor is turned on to mix charges stored in said storage capacitor element and charges stored in said floating region; and wherein:
    before said mixing period the charges stored in said floating region are read out and after said mixing period said mixed charges are read out.

2. The solid-state imaging device claimed in claim 1, further comprising an amplification transistor coupled to said floating region; wherein:

when said storage transistor is turned off, said amplification transistor amplifies and transforms charges stored in said floating region to a voltage signal; and then when said storage transistor is turned on, said amplification transistor amplifies and transforms mixed charges.

3. The solid-state imaging device claimed in claim 2, further comprising a reset transistor, wherein:

when said storage transistor is turned off, said reset transistor discharges charges from said floating region; and when said storage transistor is turned on, said reset transistor discharges charges from said floating region and said storage capacitor element.

4. The solid-state imaging device claimed in claim 3, wherein:

when said storage transistor is turned off, said floating region is discharged and noise charges are read from said floating region; and when said storage transistor is turned on, said floating region and said storage capacitor element are discharged and noise charges are read from said floating region and said storage capacitor element.

5. A solid-state imaging device comprising a plurality of pixels, wherein each two or more pixels commonly comprises a floating region and each one of said plurality of pixels comprises:

a photodiode receiving light and producing and storing photocharges;

a transfer transistor that is coupled between said photodiode and said floating region and transfers photocharges stored in said photodiode to said floating region;

a storage capacitor element;

a storage transistor provided, separately from said transfer transistor, between said floating region and said storage capacitor element; and an overflow gate provided, separately from said transfer transistor and also separately from said storage transistor, between said photodiode and the connection of said storage capacitor element and said storage transistor, said overflow gate being directly coupled to said photodiode, and wherein said overflow gate is coupled to said storage capacitor element separately from said storage transfer transistor, and wherein in a storage period of said photodiode, said overflow gate transfers photocharges overflowed from said photodiode to said storage capacitor element, without passing through said floating region, and allows said storage capacitor element to store the overflowed photocharges, wherein:

during a transfer period following a storage period of said photodiode, said transfer transistor is turned on to transfer charges stored in said photodiode to said floating region to allow said floating region to store the charges; and during a mixing period after said transfer period, said storage transistor and said transfer transistor are turned on to mix charges stored in said storage capacitor element and charges stored in said photodiode in said floating region; and wherein:

before said mixing period the charges stored in said floating region are read out and after said mixing period said mixed charges are read out.

6. A solid-state imaging device comprising a plurality of pixels, wherein each two or more pixels commonly comprises a floating region and each one of said plurality of pixels comprises:

a photodiode receiving light and producing and storing photocharges;

a transfer transistor that is coupled between said photodiode and said floating region and transfers photocharges stored in said photodiode to said floating region;

a storage capacitor element;

a storage transistor provided, separately from said transfer transistor, between said floating region and said storage capacitor element; and an overflow gate provided, separately from said transfer transistor and also separately from said storage transistor, between said photodiode and the connection of said storage capacitor element and said storage transistor, said overflow gate being directly coupled to said photodiode, and wherein said overflow gate is coupled to said storage capacitor element separately from said storage transfer transistor, and wherein in a storage period of said photodiode, said overflow gate transfers photocharges overflowed from said photodiode to said storage capacitor element, without passing through said floating region, and allows said storage capacitor element to store the overflowed photocharges, wherein:

during a transfer period following a storage period of said photodiode, said transfer transistor is turned on to transfer charges stored in said photodiode to said floating region to allow said floating region to store the charges; and during a mixing period after said transfer period, said storage transistor is turned on to mix charges stored in said storage capacitor element and charges stored in said floating region; and wherein:

before said mixing period the charges stored in said floating region are read out and after said mixing period said mixed charges are read out as signal charges.

* * * * *